US012652489B2

(12) United States Patent
Rafaely et al.

(10) Patent No.: US 12,652,489 B2
(45) Date of Patent: Jun. 9, 2026

(54) SYSTEM AND METHOD FOR ESTIMATING DIRECTION OF ARRIVAL AND DELAYS OF EARLY ROOM REFLECTIONS

(71) Applicant: B. G. NEGEV TECHNOLOGIES AND APPLICATIONS LTD., AT BEN-GURION UNIVERSITY, Beer Sheva (IL)

(72) Inventors: Boaz Rafaely, Beer Sheva (IL); Tom Shlomo, Beer Sheva (IL)

(73) Assignee: B. G. NEGEV TECHNOLOGIES AND APPLICATION LTD., AT BEN-GURION UNIVERSITY, Beer Sheva (IL)

( * ) Notice: Subject to any disclaimer, the term of this patent is extended or adjusted under 35 U.S.C. 154(b) by 200 days.

(21) Appl. No.: 18/286,671

(22) PCT Filed: Apr. 13, 2022

(86) PCT No.: PCT/IB2022/053478
§ 371 (c)(1),
(2) Date: Oct. 12, 2023

(87) PCT Pub. No.: WO2022/219558
PCT Pub. Date: Oct. 20, 2022

(65) Prior Publication Data
US 2025/0030980 A1 Jan. 23, 2025

Related U.S. Application Data

(60) Provisional application No. 63/174,039, filed on Apr. 13, 2021.

(51) Int. Cl.
*H04R 3/00* (2006.01)
*G01S 3/80* (2006.01)

(52) U.S. Cl.
CPC ............ *H04R 3/005* (2013.01); *G01S 3/8006* (2013.01); *H04R 2430/21* (2013.01)

(58) Field of Classification Search
CPC .... G01S 3/8006; G01S 3/8083; G01S 3/8086; H04R 2430/21; H04R 3/005
(Continued)

(56) References Cited

U.S. PATENT DOCUMENTS 4,054,878 A     10/1977 Diehl
2011/0273325 A1*  11/2011 Goldman ................ G01S 13/42
                                                            342/146
(Continued)

FOREIGN PATENT DOCUMENTS

CN       110082725 A     8/2019

OTHER PUBLICATIONS

Allen J.B., et al.,"Image Method for Efficiently Simulating Small-room Acoustics," The Journal of the Acoustical Society of America, Apr. 1979, vol. 65(4), pp. 943-950.
(Continued)

*Primary Examiner* — Lun-See Lao
(74) *Attorney, Agent, or Firm* — Nathan & Associates Patent Agents Ltd.; Menachem Nathan

(57) ABSTRACT

Aspects of embodiments pertain to systems for estimating direction of arrival and delays of reflected and non-reflected sources in a room received by a plurality of sound capturing devices in the room, comprising obtaining sound data descriptive of received sources. Embodiments may further comprise determining, based on the sound data, a correlation value between each two audio channels of a plurality of audio channels to obtain, for a same frequency of the plurality of frequencies, a set of correlation values; and to perform a transform on each set of frequency-related correlation values to obtain a plurality of subsets of delay
(Continued)

representations of a 3D Matrix. Each set of time delay representations may be analyzed or processed to extract information about the sources.

20 Claims, 12 Drawing Sheets

(58) Field of Classification Search
USPC ........................................ 381/56–58; 700/94
See application file for complete search history.

(56) References Cited

U.S. PATENT DOCUMENTS

| | | | | |
|---|---|---|---|---|
| 2011/0317522 A1* | 12/2011 | Florencio | .............. | G01S 3/8006 |
| | | | | 367/129 |
| 2020/0374628 A1* | 11/2020 | Stachurski | ............. | H04R 3/005 |
| 2021/0149007 A1* | 5/2021 | Kovvali | .............. | G10L 21/0264 |
| 2021/0256538 A1* | 8/2021 | Butvinik | ................ | G06N 20/00 |

OTHER PUBLICATIONS

Avargel Y., et al.,"On Multiplicative Transfer Function Approximation in the Short-Time Fourier Transform Domain," IEEE Transactions on Signal Processing, May 2007, vol. 14(5), pp. 337-340.

Cai T., et al., "Orthogonal Matching Pursuit for Sparse Signal Recovery With Noise," Transactions on Information Theory, Jul. 2011, vol. 57(7), pp. 4680-4688.

Catic J., et al., "The Role of Reverberation-related Binaural Cues in the Externalization of Speech," The Journal of the Acoustical Society of America, Aug. 2015, vol. 138(2), pp. 1154-1167, https://doi.org/10.1121/1.4928132.

Ciuonzo D., et al., "Performance Analysis of Time-Reversal Music," IEEE Transactions on Signal Processing, May 2015, vol. 63(10), pp. 2650-2662.

Ciuonzo D., "On Time-Reversal Imaging by Statistical Testing," IEEE Signal Processing Letters, Jul. 2017, vol. 24 (7), pp. 1024-1028, 10.1109/LSP.2017.2704612.

Coleman P., et al., "Object-Based Reverberation for Spatial Audio," Journal of the Audio Engineering Society, Jan. 2017, vol. 65 1/2, pp. 66-77, DOI: https://doi.org/10.17743/jaes.2016.0059.

Dibiase J.H., "Robust Localization in Reverberant Rooms," Microphone Arrays, 2001, pp. 157-180.

Dmochowski J.P., et al., "A Generalized Steered Response Power Method for Computationally Viable Source Localization," IEEE Transactions on Audio, Speech, and Language Processing, Nov. 2007, vol. 15(8), pp. 2510-2526. 10.1109/TASL.2007.906694.

Do H.,et al., "SRP-PHAT Methods of Locating Simultaneous Multiple Talkers Using a Frame of Microphone Array Data," IEEE International Conference on Acoustics, Speech and Signal Processing, Mar. 2010, pp. 125-128.

Ester M., et al., "A Density-Based Algorithm for Discovering Clusters in Large Spatial Databases with Noise," In Proceedings KDD'96, 1996, pp. 226-231.

Fisher E., et al.,"Near-Field Spherical Microphone Array Processing With Radial Filtering," IEEE Transactions on Audio, Speech, and Language Processing, Feb. 2011, vol. 19(2), pp. 256-265.

Fliege J., et al., "A Two-Stage Approach for Computing Cubature Formulae for the Sphere," 1996, pp. 1-31.

Han K., et al., "Improved Source No. Detection and Direction Estimation With Nested Arrays and ULAs Using Jackknifing," IEEE Transactions on Signal Processing, Dec. 2013, vol. 61(23), pp. 6118-6128, 10.1109/TSP.2013.2283462.

Hassab J.C., et al., "Optimum Estimation of Time Delay bya Generalized Correlator a Generalized Correlator," IEEE Transactions on Audio, Speech, and Language Processing, Aug. 1979, vol. ASSP-27(4), pp. 373-380.

Hu Y., et al., "Direction of Arrival Estimation of Multiple Acoustic Sources Using a Maximum Likelihood Method in the Spherical Harmonic Domain," Applied Acoustics, Feb. 2018 , vol. 135, pp. 85-90. https://doi.org/10.1016/j.apacoust.2018.02.005.

Javed H.A., et al., "Spherical Microphone Array Acoustic Rake Receivers," IEEE International Conference on Acoustics, Speech and Signal Processing, May 2016, pp. 111-115.

Jo B., et al., "Robust Localization of Early Reflections in a Room Using Semi Real-valued EB-ESPRIT With Three Recurrence Relations and Laplacian Constraint" Proceedings of the 23rd International Congress on Acoustics, Sep. 2019, pp. 4949-4956.

Kabal P., "Telecommunications & Signal Processing Laboratory," TSP Speech Database, Nov. 2018, pp. 1-29.

Khaykin D., et al., "Coherent Signals Direction-of-arrival Estimation Using a Spherical Microphone Array: Frequency Smoothing Approach," IEEE Workshop on Applications of Signal Processing to Audio and Acoustics, Oct. 2009, pp. 221-224.

Kowalczyk K., et al., "On the Extraction of Early Reflection Signals for Automatic Speech Recognition," In Proceedings of IEEE 2nd International Conference on Signal and Image Processing, Aug. 2017, pp. 351-355.

Mabande E., et al., "Room Geometry Inference Based on Spherical Microphone Array Eigenbeam Processing," The Journal of the Acoustical Society of America, Oct. 2013, vol. 134(4), pp. 2773-2789.

Malioutov D., et al., "A Sparse Signal Reconstruction Perspective for Source Localization With Sensor Arrays," IEEE Transactions on Signal Processing, Aug. 2005, vol. 53(8), pp. 3010-3022.

MH Acoustics., "em32 Eigenmike®Microphone Array Release Notes; Oct. 30, 2013 (V17.0)," Microphone Array, pp. 1-28.

Peled Y., et al., "Method for Dereverberation and Noise Reduction Using Spherical Microphone Arrays," In Proceedings of IEEE International Conference on Acoustics, Speech and Signal Processing, Mar. 2010, pp. 113-116.

Shlomo T., et al., "Blind Localization of Early Room Reflections From Reverberant Speech Using Phase Aligned Spatial Correlation," IEEE Transactions on Signal Processing, 2021, vol. 69, pp. 1213-1225.

Sun H., et al., "Localization of Distinct Reflections in Rooms Using Spherical Microphone Array Eigenbeam Processing," The Journal of the Acoustical Society of America, Apr. 2012, vol. 131(4), pp. 2828-2840, https://doi.org/10.1121/1.3688476.

Vincent E., et al., "From Blind to Guided Audio Source Separation : How Models and Side Information Can Improve the Separation of Sound," In Proceedings of IEEE Signal Processing Magazine, May 2014, vol. 31(3), pp. 107-115.

Wang H., et al., "Coherent Signal-Subspace Processing for the Detection and Estimation of Angles of Arrival of Multiple Wide-Band Sources," IEEE Transactions on Acoustics, Speech and Signal Processing, Aug. 1985, vol. ASSP-33(4), pp. 823-831.

Wu P.K.T., et al., "A Dereverberation Algorithm for Spherical Microphone Arrays Using Compressed Sensing Techniques," IEEE International Conference on Acoustics, Speech and Signal Processing, Mar. 2012, pp. 4053-4056.

International Search Report and Written Opinion from International Application No. PCT/IB2022/053478 mailed Aug. 14, 2022, 11 pages.

Extended European Search Report for European Application No. 22787738.8, mailed Feb. 3, 2025, 07 Pages.

Shlomo, Tom, and Boaz Rafaely. "Blind localization of early room reflections using phase aligned spatial correlation." IEEE transactions on signal processing 69 (2021): 1213-1225.

Anonymous Ping et al.: "A dereverberation algorithm for spherical microphone arrays using compressed sensing techniques." 2012 IEEE International Conference on Acoustics, Speech and Signal Processing (ICASSP). IEEE, 2012. Retrieved from the Internet: URL: https://ieeexplore.ieee.org/abstract/document/6288808.

* cited by examiner

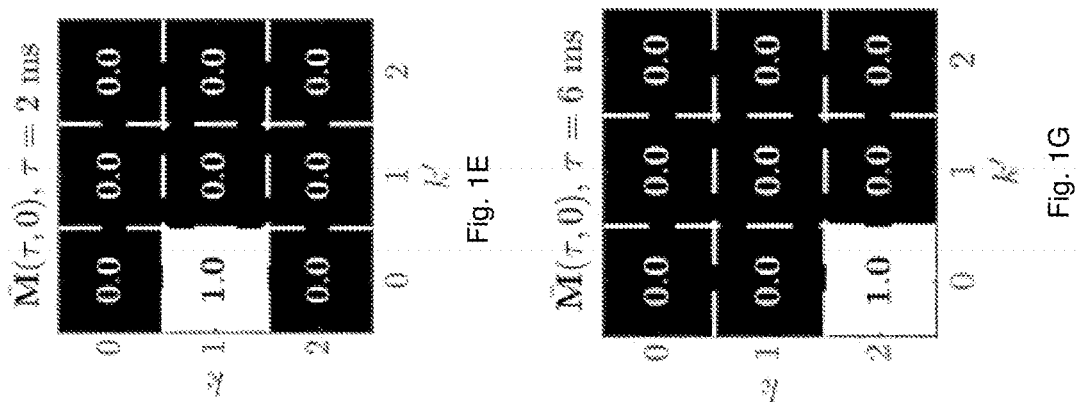
Fig. 1E
Fig. 1G
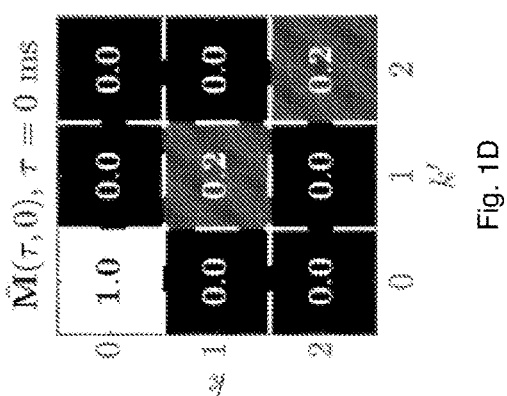
Fig. 1D
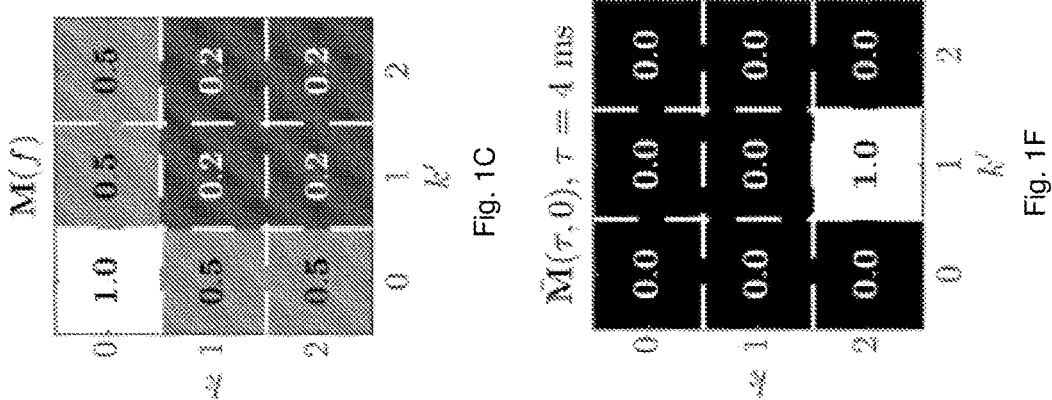
Fig. 1C
Fig. 1F

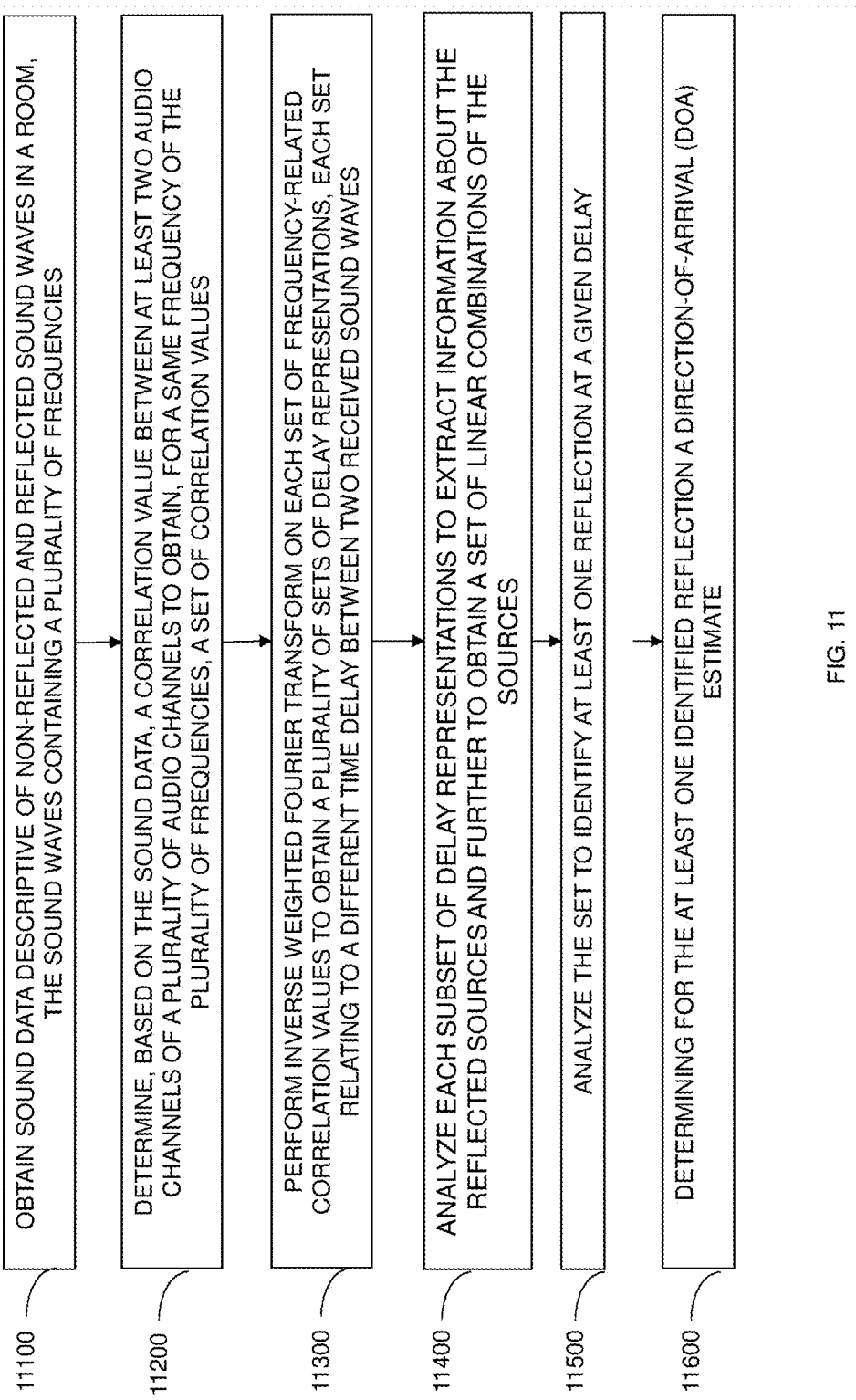

OBTAIN SOUND DATA DESCRIPTIVE OF NON-REFLECTED AND REFLECTED SOUND WAVES IN A ROOM, THE SOUND WAVES CONTAINING A PLURALITY OF FREQUENCIES

11100

DETERMINE, BASED ON THE SOUND DATA, A CORRELATION VALUE BETWEEN AT LEAST TWO AUDIO CHANNELS OF A PLURALITY OF AUDIO CHANNELS TO OBTAIN, FOR A SAME FREQUENCY OF THE PLURALITY OF FREQUENCIES, A SET OF CORRELATION VALUES

11200

PERFORM INVERSE WEIGHTED FOURIER TRANSFORM ON EACH SET OF FREQUENCY-RELATED CORRELATION VALUES TO OBTAIN A PLURALITY OF SETS OF DELAY REPRESENTATIONS, EACH SET RELATING TO A DIFFERENT TIME DELAY BETWEEN TWO RECEIVED SOUND WAVES

11300

ANALYZE EACH SUBSET OF DELAY REPRESENTATIONS TO EXTRACT INFORMATION ABOUT THE REFLECTED SOURCES AND FURTHER TO OBTAIN A SET OF LINEAR COMBINATIONS OF THE SOURCES

11400

ANALYZE THE SET TO IDENTIFY AT LEAST ONE REFLECTION AT A GIVEN DELAY

11500

DETERMINING FOR THE AT LEAST ONE IDENTIFIED REFLECTION A DIRECTION-OF-ARRIVAL (DOA) ESTIMATE

SYSTEM AND METHOD FOR ESTIMATING DIRECTION OF ARRIVAL AND DELAYS OF EARLY ROOM REFLECTIONS

CLAIM OF PRIORITY

This present application is a National Phase of PCT Patent Application No. PCT/IB2022/053478 having International filing date of Apr. 13, 2022, which claims priority to U.S. Provisional Patent Application No. 63/174,039, filed on Apr. 13, 2021, which are all incorporated by reference herein in their entirety.

BACKGROUND

Estimation of the direction of arrival (DOA) and delay of room reflections from reverberant sound may be useful for a wide range of applications such as speech enhancement, dereverberation, source separation, optimal beamforming and room geometry inference.

Early reflections have a key role in sound perception, as they can improve speech intelligibility and listener envelopment. They are also related to the impression of source width, loudness and distance. Therefore, exploitation of the early reflections can be beneficial in parametric spatial audio methods and spatial audio coding.

Existing methods for the estimation of the parameters of early reflections can be categorized as blind and non-blind. Non-blind methods, operate on room impulse response signals, or, alternatively, assume that an anechoic recording of the sound source is available. Blind methods operate on microphone signals directly, and assume that no other information is available, as is often the case in many real world applications.

Such methods employ spatial filtering, subspace methods (e.g., MUSIC or ESPRIT), sparse recovery methods which attempt to find the smallest subset of sources that explains the measured signals. Another type of methods that can localize correlated sources is based on modeling the source signals as deterministic unknowns.

The description above is presented as a general overview of related art in this field and should not be construed as an admission that any of the information it contains constitutes prior art against the present patent application.

BRIEF DESCRIPTION OF THE FIGURES

The figures illustrate generally, by way of example, but not by way of limitation, various embodiments discussed in the present document.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. References to previously presented elements are implied without necessarily further citing the drawing or description in which they appear. The figures are listed below.

FIG. 1C shows the absolute values of the entries of the mixing matrix $[M(f)]k,k'$, according to some embodiments.

FIGS. 1D-1G shows the absolute values of the entries of the phase aligned mixing matrix $[\overline{M}(\tau, 0)]_{k,k'}$ for different values of $\tau$, according to some embodiments.

FIG. 11 is a schematic flowchart of a method for estimating direction of arrival and delays of early room reflections, according to some embodiments.

DETAILED DESCRIPTION

Figures 1A, 1B:
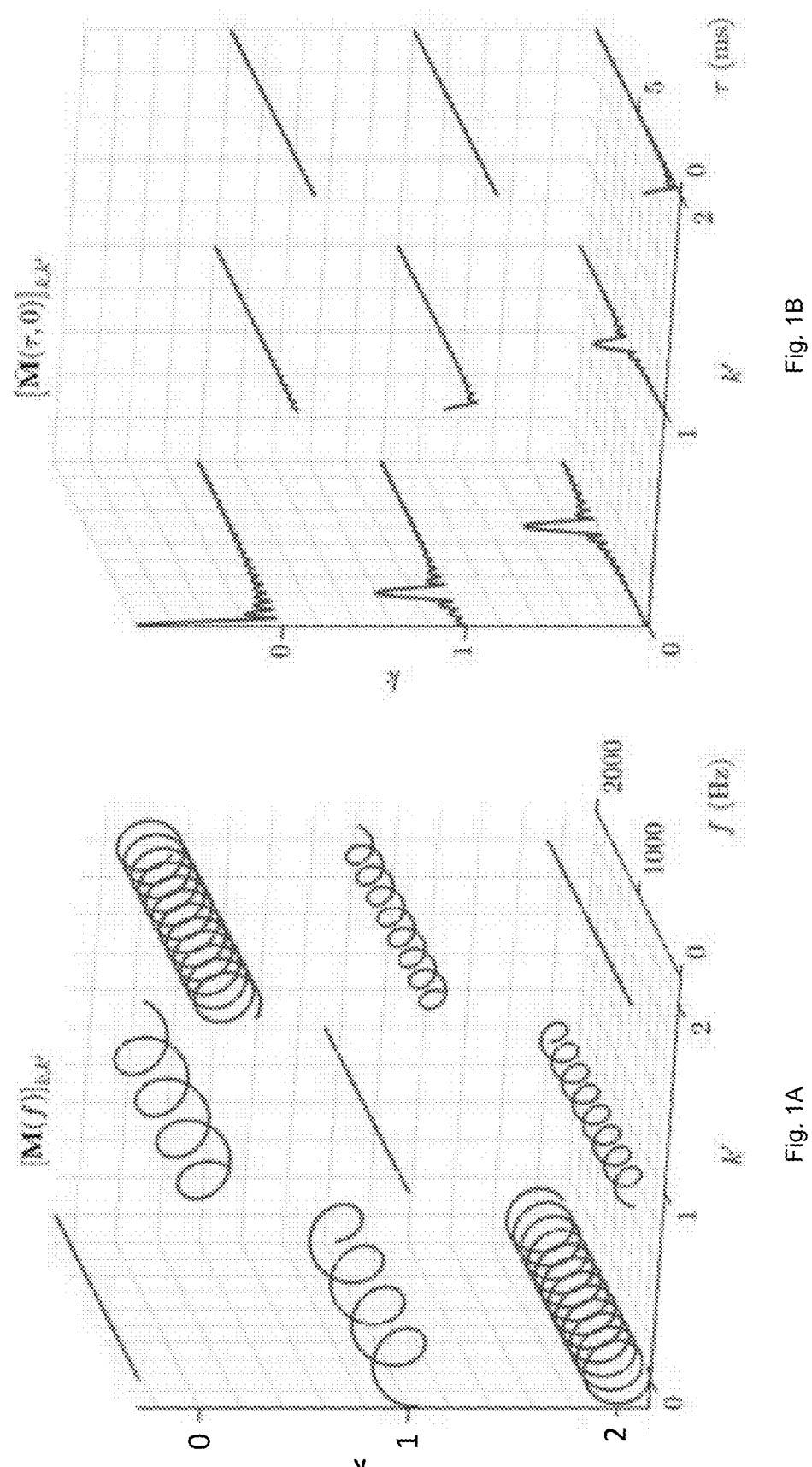
FIG. 1A shows entries of the unprocessed mixing matrix $[M(f)]_{k,k'}$ for different values of f, with the real and imaginary part of the entries added to the k and k' axes for the purpose of illustrating the complex function, according to some embodiments.
FIG. 1B shows entries of the phase aligned mixing matrix $[\overline{M}(\tau, 0)]_{k,k'}$ for different values of $\tau$, with the absolute value of the entries added to the k axis for the purpose of illustration, according to some embodiments.
Figure 2:
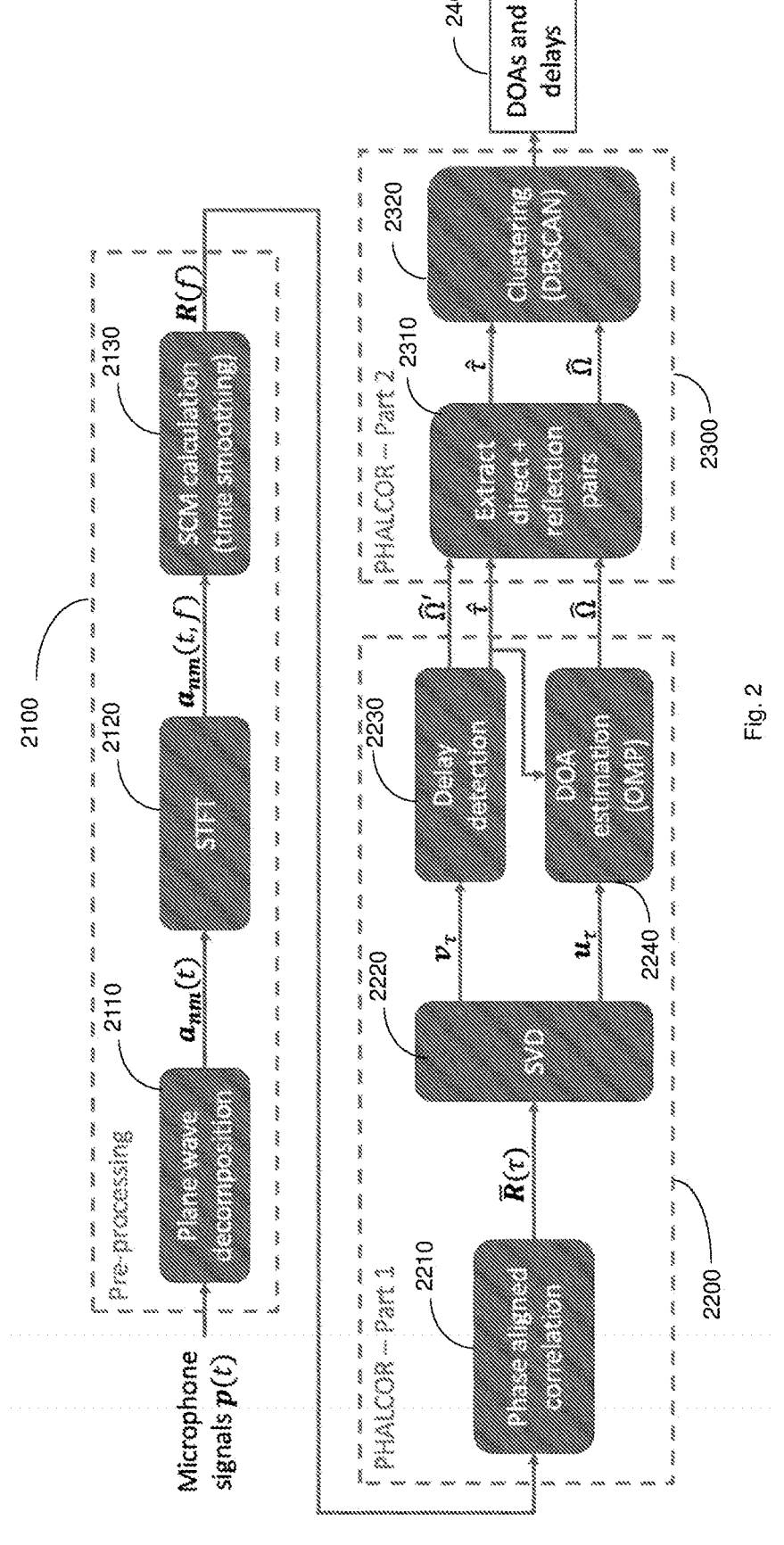
FIG. 2 is a schematic block diagram illustration of a method for estimating direction of arrival and delays of early room reflections, according to some embodiments.

Aspects of disclosed embodiments pertain to systems and/or methods for blind estimation of direction of arrival and delays of reflected and non-reflected sound waves or sources originating from, for example, a single sound wave output or speaker, or multiple speakers, located in a room. It is noted that sources may contain direct sound waves and/or reflected sound waves. The systems and/or methods disclosed herein may have be employed in conjunction with a variety of applications including, for example, audio signal processing, improving audio output, improving perceived sound quality, improving Virtual or Augmented Reality experience, estimating position of walls in a room based on reflections, etc.

The term "source" as herein may also pertain to source signals or source data descriptive of the source.

Early reflections are delayed and attenuated copies of the direct sound (also: non-reflected source). Consequently, a narrowband correlation between a non-reflected source and its reflections has a phase that is linear or substantially in frequency. The property of linearity or substantial linearity can be utilized to construct a transform that can separate reflections having different delays. The transform also enables differentiating between multiple reflections having identical or similar directions of arrival (DOAs). In some examples, the transform employed for implementing part of the method may herein be referred to as Phase Aligned Correlation (PHALCOR). The expression "early reflection" may for example pertain to the 1$^{st}$ room reflection, to the first 2 or the first 3 reflections, or the at least first 10 reflections, or the at least first 20 room reflections or more, or any number of initial reflections up to a certain threshold of initial reflections. The number of early reflections that may be characterized with the method presented herein may, for example, up to 100.

The term "Phase Aligned" is chosen for the reasons set forth herein. PHALCOR is based on a signal model in which the reflection signals are explicitly modeled as delayed and scaled copies of the direct sound. Before the phase alignment transformation, at each frequency, the contribution of each source to the correlation matrix is the product of a matrix with a complex number. The said matrix is not dependent on frequency. However, the complex number does depend on frequency, and specifically at each frequency, the phase (aka argument) of the number is different.

The phase alignment transform can "align" all these complex number to have the same phase. If this alignment is successful, the summation of all of the aligned correlation matrices (of different frequencies) is coherent and the source becomes more dominant. When a selected transform parameter $\tau$ matches with a delay of a certain source, the contribution of that reflection is significant. The alignment may be considered to be successful if the parameter $\tau$ of the transformation is approximately equal to the delay of the source.

The transform can separate reflections with different delays, enabling the detection and localization of reflections with similar DOAs. The DOAs and delays of the early reflections can be estimated by separately analyzing (e.g., processing) the left and right singular vectors of the transformed matrices using sparse recovery techniques.

The method may be applied on sound data that are descriptive of electronic signals which are representative of received sound waves. Sources may contain a plurality of frequencies, received via audio channels. Every audio channel may be considered to contain a mixture of all reflected sources and the direct source. It is noted that received sound waves may also encompass the meaning of the term "simulated or virtual sound waves". In some examples, the method may include capturing reflected and non-reflected sound waves, by converting the reflected and non-reflected sound waves incident onto a plurality of microphones of one or more microphone arrays, into corresponding electronic signals. The reflected and non-reflected sound waves may be created by generating sound waves which are output by a single sound output located in the room.

In some embodiments, the method may include determining, based on the sound data, a correlation value between at least two audio channels or between each two audio channels of a plurality of audio channels to obtain, for a same frequency of a plurality of frequencies, a set of frequency-related correlation values. The set of frequency-related correlation values are represented in a first multidimensional array, which may be referred to as a volumetric or 3D spatial correlation matrix or 3D SCM. The 3D SCM may be described as being composed of a plurality of 2D SCMs for a respective plurality of frequencies. For example, each such 2D SCM relates to a spatial correlation of received sound waves of a same frequency.

In some embodiments, the method may further include performing a transpose of the frequency-related correlation values of the 3D SCM from the frequency domain to the time domain. This may be accomplished by performing an inverse weighted Fourier transform of the 3D SCM (i.e., on the values represented by the 3D SCM) to obtain a plurality of subsets ("slices") of time delay values, represented by a second multidimensional array, which may be referred to as a 3D spatial time-delay representation matrix or 3D TDM. The 3D TDM contains a plurality of 2D TDMs relating to a respective plurality of time delays. For example, each one of such 2D TDM of the 3D TDM relates to a different time delay between two received sound waves.

In some embodiments, the method may further include analyzing each 2D TDM of time delay representations to extract information about the non-reflected sound wave and early reflected sound waves. In some embodiments, the method may include analyzing each 2D TDM of time delay representations to obtain or construct a plurality of sets of values representing a linear combination of a plurality of reflections having a same or substantially same delay. In some examples, the analyzing of the plurality of 2D TDMs of the 3D TDM may be performed through a method called Singular Value Decomposition (SVD), or any other low-rank approximation method.

In some embodiments, the method may further include analyzing the different linear combinations of sources of each set or vector, to differentiate between the source and at least one early reflection for a given delay may for example be performed through sparse recovery techniques such as, for example, Orthogonal Matching Pursuit (OMP). The column entries of the dictionary matrix are steering vectors, which are known if the geometry of the array is known, or from a calibration step.

Differentiating between at least two reflections at a given delay relative to the direct source allows determining Direction of Arrival (DOA) estimations for each one of such reflection. DOAs estimates may be determined, for example, by matching the obtained differentiated reflections and their associated delays with previously determined steering or reference vectors. A match is considered to be found if a certain matching threshold criterion is met, as is outlined herein below in more detail.

It is noted that the term "match", as well as grammatical variations thereof also encompasses the meaning of the term "substantial match".

In some embodiments, the method may further include performing clustering on the reflection data information for identifying outliers and clusters.

A. Notation

The notation used herein is presented briefly in this section. Lowercase boldface letters denote vectors, and uppercase boldface letters denote matrices. The k,l entry of a matrix A is denoted by $[A]_{k,l}$. The complex conjugate, transpose, and conjugate transpose are denoted by $(\cdot)^*$, $(\cdot)^T$ and $(\cdot)^H$, respectively. The Euclidean norm of a vector is denoted by $\bullet$. The outer-product of two vectors a and b is the matrix $ab^H$. The imaginary unit is denoted by i.

$S^2$ denotes the unit sphere in $R^3$. The symbol $\Omega \in S^2$ represents a direction (DOA) in 3D-space, i.e., a pair of azimuth-elevation angles.

$\angle(\Omega, \Omega') \triangleq \arccos(\Omega \cdot \Omega')$ is the angle between directions $\Omega$ and $\Omega'$. "$\bullet$" is the dot product in $R^3$? $\Omega_0$ represents the DOA of the non-reflected source.

It is noted that the delays and DOAs are determined with respect to the source signal.

B. Sound Field Representation Using Plane Wave Amplitude Density

Consider a sound field composed of M plane waves with amplitudes $a_1(f), \ldots, a_M(f)$ at frequency f, and directions $\Omega_1, \ldots, \Omega_M$. The sound pressure p at any point in space $x \in R^3$ can be formulated as follows:

$$p(f, x) = \sum_{m=1}^{M} a_m(f)^{ik\Omega_m}. \tag{1}$$

where $k=2\pi f/c$ is the wave-number, and c is the speed of sound. When the sound field is composed of a continuum of plane waves, the summation is replaced by an integral over the entire sphere, and the amplitudes are replaced by the plane wave amplitude density (PWAD)$a(f,\Omega)$:

$$p(f, x) = \int_{\mathbb{S}^2} a(f, \Omega)^{ik\Omega \cdot x} d\Omega \tag{2}$$

For a fixed frequency, the PWAD is a function on the unit sphere. As such, it is possible to describe it by its spherical Fourier transform (SFT) coefficients (B. Rafaely, *Fundamentals of Spherical Array Processing*. Berlin, Germany: Springer, 2015, vol. 8. (Rafaely 2015)

$$a_{n,m}(f) \triangleq \int_{\mathbb{S}^2} a(f, \Omega)[Y_n^m(\Omega)] * d\Omega \tag{2}$$

where Y is the order-n and degree-m spherical harmonic. The SFT of the PWAD can be used to represent the sound pressure as follows (Rafaely 2015):

$$p(f, x) = \sum_{n=0}^{\infty} \sum_{m=-n}^{n} 4\pi i^n j_n(kr) Y_n^m(\Omega) a_{n,m}(f) \tag{3}$$

where $r=\|x\|$, $\Omega=x/r$, and $j_n$ is the n'th order spherical Bessel function of the first kind. Equation (3) may be approximated by truncating the infinite sum to order $N=\lceil kr \rceil$ (Rafaely 2015).

k and k' are two 2 indices in the summation. k is the index of the first source in a pair, k' is the index of the second source in a pair.

A microphone array can be used to estimate the coefficients of the SFT of the PWAD with order less than or equal to N, by inverting the (truncated) linear transformation (3), a process known as plane wave decomposition. The existence and stability of the inverse transform depend on the frequency f and physical properties of the (typically spherical) microphone array. Further details can be found in Rafaely 2015.

The resulting signals are stacked in a vector of length $(N+1)^2$ as follows:

$$a_{nm} \triangleq [a_{0,0}, a_{1,-1}, a_{1,0}, a_{1,1}, \ldots, a_{N,N}]^T$$

Embodiments may herein be described in terms of the SFT of the PWAD. Processing and analysis in this domain may offer several advantages. First, the PWAD provides a description of the sound field that is independent of the microphone array. Second, the steering vectors, i.e., the response to a plane-wave from a given direction, are frequency independent. A steering or reference vector y(C) may for example be defined by the following expression:

$$y(\Omega) \triangleq \frac{\sqrt{4\pi}}{N+1} [Y_0^0(\Omega), Y_1^{-1}(\Omega), \ldots, Y_N^N(\Omega)]^H \tag{4}$$

In some examples, a constant $$\frac{\sqrt{4\pi}}{N+1}$$

is chosen for convenience such that $\|Y(\Omega)\|=1$.

Signal Processing System Model

This section presents an example model for describing and implementing embodiments. Considering for example a sound field in a room and which is comprised of a single source, with a frequency domain signal s(f), and a DOA 20, relative to a measurement point in the room. As the sound wave output by the speaker propagates in the room, it is reflected from the room boundaries (e.g., walls, ceiling, floor). The k'th reflection may for example be modeled as a separate source with DOA Elk and signal $s_k(f)$, which is a delayed and scaled copy of the source signal (see also: J. B. Allen and D. A. Berkley, "*Image method for efficiently simulating small-room acoustics,*" *J. Acoustical Soc. Amer.*, vol. 65, no. 4 pp. 943-950, 1979 (Allen et al. 1979)), and may be expressed for instance, by the following mathematical expression:

$$s_k(f) = \alpha_k e^{-i2\pi f \tau k} s(f) \tag{5}$$

where $\tau_k$ is the delay relative to the direct sound, and $\alpha k$ is the scaling factor. $\tau_0$ and $\alpha_0$ are accordingly normalized to 0 and 1, respectively. In some examples it may be assumed that the delays are sorted such that $\tau k-1 \leq \tau k$.

Furthermore, $a_{nm}(f)$ denotes the vector of the SFT coefficients of the PWAD, up to order N, as a function of frequency. Assuming the sources are in the far field, $a_{nm}(f)$ can for example described by the following model:

$$a_{nm}(f) = Ys(f) + n(f) \tag{6}$$

where:

$$s(f) \triangleq [s_0(f), \ldots, s_K(f)]^T \tag{7}$$

$$Y[y(\Omega_0), \ldots, y(\Omega_K)] \tag{8}$$

n(f) represents noise and late reverberation terms, and K is the number of early reflections. Note that although both the model and the proposed method can be generalized to include nearfield sources, this generalization may require near-field steering vectors and some information or estimation of source output distances, which could relate to source delays. Nevertheless, the near-field steering become useful for sources very close to the array (E. Fisher and B. Rafaely, "*Near-field spherical microphone array processing with radial filtering,*" *IEEE Trans. Audio, Speech, Lang. Pro-*

*cess.*, vol. 19, no. 2, pp. 256-265, February 2011 (Fisher 2011))) in which case room reflection may be considered negligible. Therefore, embodiments are herein described with the far-field assumption, which is valid for comparatively compact microphone arrays.

Any assumption described herein shall not be construed in a limiting manner. Hence, embodiments may also encompass models where these assumption may not be applied. For example, embodiments may encompass models where far-field assumptions do not apply.

In the discussion that follows R(f) denote the spatial correlation matrix (SCM) at frequency f:

$$R(f) \triangleq \mathbb{E}\left[a_{nm}(f)a_{nm}(f)^H\right] \tag{9}$$

Substituting Eq. (6) into Eq. (9), and assuming n(f) and s(f) are uncorrelated, yields:

$$R(f) = YM(f)Y^H + N(f) \tag{10}$$

where $$N(f) \triangleq \mathbb{E}\left[n(f)n(f)^H\right] \tag{11}$$

$$M(f) \triangleq \mathbb{E}\left[s(f)s(f)^H\right] \tag{12}$$

(Phase Alignment) Transformation of the SCM

In some embodiments, the method may be considered to include applying a transform or transformation on the SCM. The transform may be considered to be based on a "phase alignment" transformation, e.g., as defined herein.

A. Considerations for Applying the Transformation

Equation (10) can be rewritten as:

$$R(f) = \sum_{k=0}^{K}\sum_{k'=0}^{K}[M(f)]_{k,k'}\, y(\Omega_k)y(\Omega_{k'})^H + N(f) \tag{13}$$

When neglecting N, the matrix R is a mixture (also: linear combination) of the outer products of every pair of sources' steering vectors. The mixing coefficients are the entries of M, and therefore it is henceforth referred to as the mixing matrix. Note that the mixing coefficients are frequency dependent, but the steering vectors are not. The k,k' entry of matrix M(f) is the correlation value between source k and source k'.

Supposing that the k,k' entry of M(f) has a dominant magnitude, relative to all other entries. This leads to the following, for some c∈C:

$$R(f) \approx cy(\Omega_k)y(\Omega_{k'})^H + N(f) \tag{14}$$

Estimating $\Omega_k$ and $\Omega_{k'}$ for a case where dominant entries are likely, is easier than in the general case. However, according to (12), there may not be a dominant entry in M. Not only is the matrix M Hermitian, but also the magnitudes of its entries are products of amplitudes between pairs of two sources. Assuming the amplitude of the direct sound may be dominant, the 0, 0'th entry that corresponds to the direct sound only may indeed be dominant. Clearly, this is not useful for localizing the early reflections. The method presented herein enhance specific entries in M, allowing localizing "non-dominant" entries or reflections.

B. Phase Aligned Spatial Correlation

The following matrix is defined, herein referred to as "Phase-Aligned SCM":

$$\overline{R}(\tau, f) \triangleq \sum_{j=0}^{J_f-1} w_j\, R(f + j\Delta f)e^{i2\pi\tau j\Delta f} \tag{15}$$

where τ≥0, Δf is the frequency resolution, and $J_f$ is an integer parameter representing the overall number of frequency points. $w_0, \ldots, w_{J_f-1}$ are non-negative weights. Note that when τ=0 and $w_j$=0, then $\overline{R}$ is identical to the SCM that may be obtained by frequency smoothing. The matrices $\overline{N}(\tau, f)$ and $\overline{M}(\tau, f)$ are similarly defined by replacing R in Equation (15) with N and M, respectively, such that:

$$\overline{R}(\tau, f) = \sum_{k=0}^{K}\sum_{k'=0}^{K}[\overline{M}(\tau, f)]_{k,k'}\, y(\Omega_k)y(\Omega_{k'})^H + \overline{N}(\tau, f) \tag{16}$$

Similarly to Eq. (13), Eq. (16) presents $\overline{R}$ as a mixture (also: linear combination) of the outer products of every pair of the sources' steering vectors. This property of $\overline{R}$ form a basis for the method described herein.

Similarly to Eq. (13), Eq. (16) presents $\overline{R}$ as a mixture of outer products of pairs of sources' steering vectors. It is proven that for a fixed f, the k, k' entry of $\overline{M}(\tau, f)$ is maximized for $\tau=\tau_k-\tau_{k'}$.

First, a explicit expression for the absolute value of the entries of $\overline{M}$ for an arbitrary τ is derived:

$$\left|[\overline{M}(\tau, f)]_{k,k'}\right| = \left|\sum_{j=0}^{J_f-1}[M(f_j)]_{k,k'}\, w_j e^{i2\pi\tau j\Delta f}\right| \tag{17}$$

$$= \left|\sum_{j=0}^{J_f-1}\mathbb{E}[s_k(f_j)s_{k'}(f_j)]w_j e^{i2\pi\tau j\Delta f}\right|$$

$$= \left|\sum_{j=0}^{J_f-1}\alpha_k\alpha_{k'}^*\sigma_s^2(f_j)w_j e^{i2\pi\tau j\Delta f(\tau-(\tau_k-\tau_{k'}))}\right|$$

TABLE 1

| Parameters for the Numerical Example: | | |
|---|---|---|
| k | $\tau_k$ (ms) | $\alpha_k$ |
| 0 | 0 | 1 |
| 1 | 2 | 0.7 |
| 2 | 6 | 0.5 | where $f_j = f + j\Delta f$ and $\sigma_s^2(f_j) \triangleq \mathbb{E}[|s(f_j)|^2]$ (18)

The second equality in Eq. (17) is due to the definition of M(f) in Eq. (12), while the third equality is due to Eq. (5). Considering the triangle-inequality:

$$\left|[\overline{M}(\tau, f)]_{k,k'}\right| \le \sum_{j=0}^{J_f-1}\left|\alpha_k\alpha_{k'}^*\sigma_s^2(f_j)w_j\right| \tag{19}$$

-continued $$= \left| \left[ \overline{M}(\tau_k - \tau_{k'}, f) \right]_{k,k'} \right|$$

which is true since $\sigma$ and $w_j$ are non-negative.

Along with Equation (16) this result implies that this result implies that among all possible delays r, it is the delay between two sources that maximizes the contribution of the outer product of their steering vectors to $\overline{R}(\tau,f)$. This observation is at the core of our method. To better understand its implications, consider the following special case.

C. Special Case: White Source Signal

In this subsection the source signal is assumed to be white, such that such that $\sigma_s^2(f)$ is constant in f. In examples in which the weights $w_j$ are all set to 1, equation (17) can thus be further simplified $$\left| \left[ \overline{M}(\tau, f) \right]_{k,k'} \right| = \sigma_s^2 \left| \alpha_k \alpha_{k'}^* \sum_{j=0}^{J_f-1} e^{i2\pi j \Delta j (\tau - (\tau_k - \tau_{k'}))} \right| \qquad (20)$$

$$= \sigma_s^2 \left| \alpha_k \alpha_{k'}^* \mathcal{D}_{J_f} (\Delta f(\tau - (\tau_k - \tau_{k'}))) \right|$$

where $$\mathcal{D}_n(x) \triangleq \begin{cases} n & x \in \mathbb{Z} \\ \dfrac{\sin(\pi n x)}{\sin(\pi x)} & x \notin \mathbb{Z} \end{cases} . \qquad (21)$$

Dn(x) often arises in Fourier analysis, and is related to the Dirichlet kernel. It has a sinc-like behavior, with a main lobe centered around x=0, and a null-to-null width of 2/n. Correspondingly, $|[\overline{M}(\tau, f)]_{k,k'}|$ has a main lobe centered at $\tau=\tau_k-\tau_{k'}$ and a width of $2(J_f \Delta f)-1$. Therefore, $J_f$ determines the temporal resolution, which affects the ability to separate reflections with different delays. This result can be used as a guideline for choosing $J_f$. Note that the same analysis is valid for non white signals, if the weights satisfy $$w_j \propto 1/\sigma_s^2(f_j)$$

With reference to FIGS. 1(a)-1(g), a numerical example is now discussed for K=2 reflections and the corresponding parameter values, as listed in Table 1.

FIG. 1A presents the entries of the untransformed mixing matrix M(f). Since the signal is white, the k, k' entry is a complex sinusoidal of the form $$\sigma_s^2 \alpha_k \alpha_{k'}^* e^{i2\pi f(\tau_k - \tau_k')}$$

(see Eqs. (5) and (12)). Its real and imaginary parts are added to the k and k' axes, respectively, for the purpose of illustration of the complex function. This illustration demonstrates that as the delay between two sources is decreased, the period of the corresponding entry, as a function off, increases. At the extreme, the delay between a source and itself is zero, and so the diagonal entries are constant in frequency.

FIG. 1C presents the absolute value of the entries of M(f). Note that the absolute value does not depend on f in this case. It is evident that M(f) is not sparse.

FIG. 1B presents the entries of the phase aligned mixing matrix $\overline{M}(\tau,f)$, where $\Delta f J_f=2000$ Hz. In this plot, only the absolute value of the matrix entries is shown, and is added to the k-axis for the purpose of illustration.

FIGS. 1D to 1g show several cross sections of FIG. 1B, i.e., the absolute values of the entries of $\overline{M}(\tau,0)$ for selected values of $\tau$. When r is equal to a delay between two sources, which is the case in FIGS. 1E-1G, $\overline{M}(\tau,0)$ is approximately sparse, and the most dominant entry is the one corresponding to the two sources. For other values of $\tau$, all entries of $\overline{M}(\tau, f)$ are relatively small. For $\tau=0$, $\overline{M}(\tau,f)$ is approximately a diagonal matrix. In the FIGS. 1C to 1G the entries are normalized such that the maximum value is 1.

Since in that case the off diagonal entries can be interpreted as correlations between different sources, this demonstrates the fact that optional frequency smoothing ($\tau=0$) performs decorrelation of the sources. If the reflections had the same delay, $\overline{M}(0,0)$ would contain dominant off diagonal entries, and frequency smoothing would have failed to decorrelate the sources. Furthermore, while for $\tau=0$ all 3 sources are dominant simultaneously, for values of r that correspond to delays between sources, only a subset of the sources are dominant.

D. Signal-Informed Weights Selection

The analysis presented in the previous subsection shows that if the weights $\{w_j\}j$ are inversely proportional to $\sigma_s^2(f_j)$, the phase alignment transform can effectively separate reflections with different delays. Assuming $w_j=c/\sigma_s^2(f_j)$ (where c is some positive constant) is equivalent to assuming $w_j=1$ and $\sigma_s^2(f_j)=c$ for all j, since their product is all that matters.

As $\sigma_s^2(f)$ is usually unknown, it must be estimated from the data. A very coarse, yet simple, estimate is given by the trace of R(f). By neglecting N in Eq. (13) and substituting Eqs. (12), (5) and (18), we get:

$$tr(R(f)) \approx \sum_{k,k'} [M(f)]_{k,k'} tr\left( y(\Omega_k) y(\Omega_{k'})^H \right) \qquad (22)$$

$$= \sum_{k,k'} \mathbb{E}[s_k(f) s_{k'}^*(f)] y(\Omega_{k'})^H y(\Omega_k)$$

$$= \sigma_s^2(f) \sum_{k,k'} e^{-i2\pi f(\tau_k - \tau_{k'})} \alpha_k \alpha_k^*, \ y(\Omega_{k'})^H y(\Omega_k)$$

$$= \sigma_s^2(f) \sum_k |\alpha_k|^2 (1 + b_k(f)),$$

where $$b_k(f) \triangleq 2\Re \left( \sum_{k'>k} \frac{\alpha_k}{\alpha_k} e^{i2\pi f(\tau_k - \tau_k')} y(\Omega_k)^H y(\Omega_{k'}) \right) \qquad (23)$$

and $\Re$ returns the real part of a complex scalar. We argue that $b_k$ is typically small in comparison to 1, since usually the amplitudes decay rapidly. Furthermore, when two reflections have similar amplitudes, it is usually the case that they have very different DOAs, which implies that the inner product of their steering vectors is small (Rafaely 2015).

In some examples, the weights could have another role. Eq. (20) suggests that even if the weights are inversely proportional to $\sigma_s^2$, reflections with delays other than r may still be dominant in $\overline{M}(\tau, f)$, as $D_n$ have strong side lobes. The side lobe levels can be reduced by introducing a window function, at the expense of increasing the width of the main lobe (A. V Oppenheim, *Discrete-Time Signal Processing*. New York, NY, USA: Pearson Education India, 1999 (Oppenheim 1999))

E. Rank 1 Approximation of Phase Aligned SCM

In the following, the dependence on the frequency f is omitted for brevity. It is important to note that there is no direct access to $\overline{M}(\tau)$; it is only indirectly observed through $\overline{R}(\tau)$ as given by Eq. (16). When the proposed transformation succeeds in enhancing a single entry in $\overline{M}(\tau)$, $\overline{R}(\tau)$ will be dominated by a single outer product of steering vectors $y(\Omega)y(\Omega')^H$. As an outer product is a rank 1 matrix, it is-expected that the rank 1 approximation of $\overline{R}(\tau)$ would perform denoising, i.e., reduce the contribution of $$\overline{N}(\tau).$$

The optimal rank 1 approximation (in the least squares sense) of $(\tau)$ is denoted by $\overline{R}(\tau)$, and is given by truncating its singular value decomposition (SVD):

$$\overline{R}_1(\tau) = \sigma_\tau u_\tau v_\tau^H,$$

where $\sigma_\tau$ denotes the first (largest) singular value of $\overline{R}(\tau)$, and $u_\tau$ and $v_\tau$ denote corresponding left and right singular vectors, respectively. Besides performing denoising, the SVD also separates the two steering vectors, as $u_\tau$ and $v_\tau$ are approximately equal (up to phase) to $y(\Omega)$ and $y(\Omega')$, respectively. If there are several reflections with the same delay $\tau$, $\overline{R}(\tau)$ is still approximately of rank 1 since the dominant entries in $\overline{M}(\tau)$ all appear at the same column. However, in that case $u_\tau$ is not a single steering vector, but rather a linear combination of the steering vectors of the reflections with delay $\tau$.

V. Example Method Implementation for Estimating DOAs and Delays of Early Reflection The method may be based on the analysis of the first singular vectors of the phase aligned SCM R($\tau$, f) that are presented herein.

In some embodiments, the method may first include performing plane wave decomposition on captured microphone signals (block 2110).

In some examples, analysis of SCM R($\tau$,f) may require that the plane wave decomposition signals to be in the frequency domain.

In some other examples, the plane decomposition signals may be approximated using, for example, the short time Fourier transform (STFT) (block 2120). STFT may enable localized analysis in both time and frequency. In some examples, it may be assumed that the window length of the STFT is sufficiently larger than $\tau_K$, such that the multiplicative transfer function (MTF) approximation in the STFT is applicable for Eq. (5) (Y. Avargel and I. Cohen, *"On multiplicative transfer function approximation in the short-time Fourier transform domain,"* IEEE Signal Process. Lett., vol. 14, no. 5, pp. 337-340, May 2007 (Avargel 2007))

In the following, r is the parameter of the phase alignment transform as in Eq. (15), and should not be confused with the time index of the STFT.

SCM Calculation:

In some embodiments, the method may include, for each time-frequency bin, estimating R (also: "3D SCM") by replacing the expectation in Eq. (9) with averaging across $J_r$ adjacent bins in time (block 2130). SCM calculation may, in some embodiments, involve time smoothing. Blocks 2110, 2120 and 2130 may herein be referred to as a "pre-processing" block 2100.

Frequency-to-Time Transform

In some embodiments, $\overline{R}$ ($\tau$,f) may then be calculated based on R for $\tau=0$, $\Delta\tau$, . . . , $(J_\tau-1)\Delta\tau$ using Eq. (15) (block 2210), which can be defined as performing a frequency-to-time transform. The obtained set of values $\overline{R}$ ($\tau$,f) represents a plurality of subsets of delay representations, each set relating to a different time delay between two received sound waves. $\Delta\tau$ dictates the delay estimation resolution, while $J_\tau$ dictates the maximal detectable delay of a reflection. At some instances, when the discussion herein pertains to performing analysis on a single frequency, notation of the argument "f" may be omitted for brevity.

Examples for selecting these parameters is discussed further below in more detail, as well as a method to efficiently calculate $\overline{R}$ using the fast Fourier transform (FFT). The weights may for example be set using the method described in the Section titled "Signal-Informed Weights Selection":

$$w_j = \frac{W_j}{tr(R(f_j))} \tag{24}$$

where $W_j$ is the j'th sample of a Kaiser window of length $J_f$. In some examples, the $\beta$ parameter may be set to, for example, 3 (Oppenheim 1999). In some other example implementations, the $\beta$ parameter may be set to values ranging from 2 to 7.

Delay Detection:

The method may further include detecting delay values t that are equal to (or substantially equal or match with) reflection delays (block 2230).

The detection of such values may for example be accomplished by thresholding the following signal:

$$\rho(\tau) = \max_{\Omega' \in \mathbb{S}^2} |y(\Omega')^H v_\tau| \tag{25}$$

where $v_\tau$ is a first right singular vector of $\overline{R}(\tau)$ obtained through SVD (block 2220). Equation 25 may herein be referred to as defining a steering matching criterion. By the Cauchy-Schwartz inequality, since both $v_\tau$ and $y(\Omega)$ are unit vectors, $\rho(\tau) \in [0,1]$ and is equal to 1 if and only if $v_\tau$ is equal (up to phase) to a steering vector. In some examples, the threshold $\rho(\tau)$ for associating a reflection with a steering vector may for example be set (e.g., empirically) to $\rho_{min}=0.9$. In some other example implementations, the threshold $\rho(\tau)$ may range from 0.75 to 0.99.

By $\hat{\Omega}'(\tau)$ the direction is denoted that attains the maximum in Eq. (25):

$$\hat{\Omega}'(\tau) = \arg\max_{\Omega' \in \mathbb{S}^2} |y(\Omega')^H v_\tau|. \tag{26}$$

When $\tau$ is equal to a reflection's delay, $\hat{\Omega}'(\tau)$ is an estimate of $\Omega_0$ (the DOA of the direct sound). Note that when $\tau$ is equal to a delay between two reflections (and not a delay between a reflection and the direct sound), $\rho(\tau)$ may be high as well, leading to false detections. However, by employing cluster analysis for example, such detections may be distinguishable from valid ones, as $\hat{\Omega}'(\tau)$ will be different from $\Omega_0$.

3) DOA Estimation: The method may further include estimating the DOAs of the reflections, for example, by employing a sparse recovery technique (block 2240). Estimating the DOAs may be performed separately for every r selected in the previous step. Let $u_\tau$ denote a first left singular vector of $R^-(\tau)$. $u_\tau$ is approximately equal to a linear combination of the steering vectors of the reflections with a delay close to $\tau$. If there is only a single such reflection, then its DOA can be estimated using a similar method to that of the direct sound (Eq. (26)). However, in practice there might be several reflections with similar delays. Since their number is expected to be quite small, the method may include utilizing sparse recovery to estimate the DOAs. Specifically, we aim to solve the following problem: Find the smallest set of directions $\Omega^\wedge_1, \ldots \Omega^\wedge s$ and coefficients $x_1, \ldots x_s$, such that $$\left\| \sum_{s=1}^{S} x_s y(\hat{\Omega}_s) - u_\tau \right\|^2 \leq \epsilon_u \tag{27}$$

where $\epsilon_u \in (0, 1)$ may be predefined threshold, set experimentally for example, to 0.4. In some examples, the parameter value may range from 0.2 to 0.8. The parameter $\epsilon_u \in (0, 1)$ represents the error between linear combinations of the steering vectors.

In the context of sparse recovery, the set of vectors $\{y(\Omega):\Omega \in S^2\}$ is known as the dictionary, and its elements are known as atoms. The optimization problem is computationally intractable and cannot be exactly solved in practice.

In some embodiments, the method may include applying the orthogonal matching pursuit (OMP) algorithm (T. T. Cai and L. Wang, "Orthogonal matching pursuit for sparse signal recovery with noise," IEEE Trans. Inf. Theory, vol. 57, no. 7, pp. 4680-4688, July 2011 (Cai 2011)) or any other algorithm that may be extendable to infinite dictionaries.

In some examples, it may be assumed that early reflections with similar delays may have very different DOAs as they originate from different walls. If the angle between the DOAs is larger than $\pi/N$, the corresponding steering vectors are approximately orthogonal (Rafaely 2015). The sparse recovery technique may be selected such that the projection step only removes the contribution of steering vectors of DOAs the have already been found, without affecting the rest.

In some embodiments, the sparse recovery (e.g., OPM) algorithm is applied on $u_\tau$ for every detected $\tau$. In some example implementations, values of $\tau$ where the resulting s is larger than $s_{max}$ are discarded. In some examples, the value of $s_{max}$ may be (e.g., empirically) set to 3, which may be the smallest set of directions meeting criterion of Equation 26. In some other example implementations, the smallest set of directions may contain 2, 3, 4, 5, 6, 7, or 8 directions.

As a result of finding the smallest set of reflections meeting the requirements defined in Equation 26, a plurality of tuples can defined, where each tuple pertains to a reflection delay estimation relative to direct sound, and a corresponding DOA estimation of the same reflection relative to direct sound, and the DOA of the direct sound. Hence, in some embodiments, each estimate is a triplet of the form $(\hat{\tau}, \hat{\Omega}, \hat{\Omega}')$ corresponding to the delay of a reflection, its DOA and the DOA of direct sound.

Cluster Analysis

In some embodiments, a triplet $(\hat{\tau}, \hat{\Omega}, \hat{\Omega}')$ is obtained in a process of extracting direction and reflection pairs (block 2310). Clustering (block 2320) may be performed on the triplet, for example, to identify and remove outliers, for obtaining global estimates for the DOAs and delays of the early reflections (output 2400).

In some embodiments, the detection and removal of outliers may be performed by discarding reflection estimates where and angle between $\hat{\Omega}'$ and $\Omega_0$ is larger than a predefined outlier threshold angle. In some examples, the outlier threshold angle may be set to 10 degrees. In some other examples, the outlier threshold angle may range from 5 to 30 degrees.

In general, the DOA of the direct sound $\Omega_0$ may not be known in advance. However, $\Omega_0$ may be derivable by selecting the peak in the histogram of $\hat{\Omega}'$. By discarding reflection estimates from $(\hat{\tau}, \hat{\Omega}, \hat{\Omega}')$, an updated or remaining set of tuples $(\hat{\tau}, \hat{\Omega}, \hat{\Omega}')$ is obtained.

In some embodiments, cluster analysis may be performed on the remaining set of tuples $(\hat{\tau}, \hat{\Omega}, \hat{\Omega}')$, for example, by employing the DBSCAN algorithm (M. Ester, H.-P. Kriegel, J. Sander, and X. Xu, "A density-based algorithm for discovering clusters in large spatial databases with noise," K dd, vol. 96, no. 34, pp. 226-231, 1996 (Ester 1996)) or any other algorithm that, for example, may not require an initial estimate of the number of clusters. Hence, in some example implementations, a clustering algorithm may be selected where the number of reflections is automatically estimated by the algorithm. Furthermore, in some examples, the clustering algorithm may be selected such that assigning an outlier to a specific cluster may not be required. Hence, in some examples, the DBSCAN cluster algorithm may be selected (Ester 1996).

However, in some embodiments, other clustering algorithms may be selected which may, for example, provide improved performance compared to DBSCAN with respect to other performance parameter values. For example, cluster algorithms may be selected from a computational viewpoint, as the complexity of DBSCAN in the present implementation is quadratic in the number of data points.

In the DBSCAN algorithm, two points are defined as neighbors of a cluster if the distance between them is less then distance threshold $\varepsilon$. A core point of a cluster may be defined as a point having a number of neighbors that is equal or greater than MINPTS. A noise point is a non-core point, for which none of its neighbors are core points. The algorithm iterates over all the points in the dataset, and assigns two points to the same cluster if one of them is identified a core point. Noise points are not assigned to any cluster.

In some examples, the following metrics may be used:

$$d((\tau_a, \Omega_a), (\tau_b, \Omega_b)) = \sqrt{\left(\frac{\angle \Omega_a, \Omega_b)}{\gamma_\Omega}\right)^2 + \left(\frac{\tau_a - \tau_b}{\gamma_\tau}\right)^2} \tag{28}$$

where $\gamma_\Omega$ and $\gamma_\tau$ are normalization constants, set for example empirically to, e.g., 15 degrees and 500 microseconds, respectively. As the metric is normalized, the parameter value is simply set to 1. MINPTS may for example be empirically set to, e.g., 10 percent, of the number of neighbors of the point that has the largest number of neighbors.

In some embodiments, global delays and DOE estimates are calculated for each cluster, for example, by determining, for each cluster, an average or median of the local delays and DOE estimates.

The local delay estimates may be confined to a grid of resolution $\Delta\tau$. However, the global delay estimates, being averages of local delay estimates, are not. The fact that each DOA estimate has an associated delay, enables the separation of clusters from one another based on the delay, even if they have similar DOAs.

Practical Considerations

Avoiding Redundant Processing

The information captured in $\overline{R}$ contains contributions from a rectangular region in the time-frequency domain of size $J_\tau \times J_f$. Therefore, it can be expected that the process of frequency-to-time transformation (block 2210), analyzing the plurality of 2D TDMs of the 3D TDM resulting from the frequency-to-time transformation (block 2220) for identifying reflection delay values T that are equal to (or substantially equal or match with) a reflection delay (block 2230) of a steering vector, and further for identifying matching DOE with respect to the identified delays (block 2240), would be similar when applied to different regions having a large overlap in frequency. Hence, to reduce computation time, in some embodiments, the overlap between the time-frequency regions in blocks 2210, 2220, 2230 and 2240 can be reduced. For example, in the simulation study discussed below, an overlap of, e.g., 87.5% in frequency may be selected, such that each frequency is processed 8 times. In some examples, blocks 2210, 2220, 2230 and 2240 may herein be referred to as Phalcor—Part 1.

Acceleration Using the (Inverse) FFT

As mentioned herein, method comprises performing a frequency-to-time transformation on the correlation matrix to obtain $\overline{R}(\tau)$ for a grid of values of $\tau$. If $(\Delta\tau \cdot \Delta f)^{-1} \in N$, then the sequence $$\left(\overline{R}(j\Delta\tau)\right)_{j=0}^{J_\tau - 1} \tag{29}$$

is equal (up to scaling and appropriate zero-padding) to the first $J_\tau$ terms of the inverse discrete Fourier transform (taken entry wise) of the sequence $$\left(w_j R(f + j\Delta f)\right)_{j=0}^{J_\tau - 1} \tag{30}$$

so $\overline{R}(\tau)$ can be calculated can be calculated efficiently for the grid of delays using the FFT. A further reduction in the computation time can be achieved using the following identity, obtained directly from Equation (15) and from the fact that R is Hermitian:

$$\overline{R}(\tau) = \overline{R}\left(\Delta f^{-1} - \tau\right)^H \tag{31}$$

Thus, it may in some embodiments sufficient to perform the FFT on only the upper triangular entries of R.

Periodicity of Phase Aligned SCM

It is apparent from Equation (15) that $\overline{R}(\tau)$ is periodic with respect to r, with period $\Delta f^{-1}$. This periodicity does not introduce ambiguity in the delay estimation for the following reason:

When the STFT window size is T, the frequency resolution of the STFT $\Delta f$ satisfies $\Delta f \leq 1/T$. Therefore, reflections with delay $\tau$ larger than $\Delta f^{-1}$ necessarily do not satisfy the MTF approximation criteria, since $\tau > T$. This analysis also shows that to avoid unnecessary calculations, J, may in some embodiments be chosen such that $J_\tau \Delta\tau < \Delta f^{-1}/2$.

Selecting the Parameters of the Phase Alignment Transform

The calculation of $\overline{R}$ may require the selection of three parameters: $J_f$, $\Delta\tau$ and $J_\tau$. The number of frequency bins $J_f$, may be chosen such that the temporal resolution (given by $(\Delta f J_f)^{-1}$) is sufficient. For example, if $J_f \Delta f = 2000$ Hz, then the phase alignment transform can separate two reflections if their delays are spaced by more than 0.5 ins. However, $J_f$ may not be set arbitrarily high. First, the frequency independence of steering vectors is in practice limited to a given band, depending on the geometry of the microphone array. Second, some model assumptions may only be valid for bands of limited width. For example, the linear phase assumption in Equation (5) may, in practice, only hold within a local frequency region.

Once $J_f$ has been determined, $\Delta\tau$, the delay estimation resolution, may for example be set as follows:

$$\Delta\tau = \frac{1}{M\Delta f} \tag{32}$$

where M is an integer that satisfies $M \geq J_f$. This choice guarantees that $\Delta\tau \leq (J_f \Delta f)^{-1}$, and also that $(\Delta\tau \cdot \Delta f)^{-1} \in N$, so the FFT can be used to calculate $\overline{R}$. Increasing M beyond $J_f$ might increase the resolution of delay estimation; however, it would also increase the computation time of the algorithm.

In some embodiments, $J_\tau$, the number of grid points over $\tau$, may be chosen such that $(J_\tau - 1)\Delta\tau$, the maximal detectable delay, is sufficiently small relative to T, the window length of the STFT such that the MTF criteria for Equation (5) holds. In some examples, $(J_\tau - 1)\Delta\tau \approx T/10$ may be considered sufficient.

Maximizing Over the Sphere

Both Equation 25 and the OMP algorithm may require maximizing functions of the form $f(\Omega) = |y(\Omega)^H x|$ over the sphere. This may be considered is equivalent to finding the maximum of a signal on the sphere whose SFT is given by x.

In some embodiments, the Newton's method may be employed for performing this maximization, with initialization obtained by sampling the sphere, for example, with a nearly uniform grid of 900 directions (J. Fliege and U. Maier, "A two-stage approach for computing cubature formulae for the sphere," in Mathematik 139 T, Universitat Dortmund, Fachbereich Mathematik, Universitat Dortmund, 44221. Citeseer, 1996. (Fliege 1996)). Clearly, any other suitable number of grid directions may be chosen.

Computational Complexity

In some embodiments, Part 1 of PHALCOR may be independently for every selected time-frequency region, and therefore the total computation time grows linearly with the duration of the input signal. As the phase alignment transform can be calculated comparatively efficiently using the FFT, the main bottlenecks here are the SVD, delay detection and DOA estimation.

While calculating the SVD of an SCM is common in many localization methods, it is usually calculated once for every selected time-frequency region. In PHALCOR, however, it is calculated $J_\tau$ (the size of the $\tau$-grid) times for every selected time-frequency region. As $J_\tau$ controls the maximal detectable delay, there may be a trade off between the maximal detectable delay and the computational complexity. By decreasing $J_\tau$ and increasing $\Delta\tau$ ($\tau$-grid resolution), one can decrease run time without changing the maximal detectable delay. However, increasing $\Delta\tau$ comes at the cost of poor delay resolution.

17

The calculation of $\rho$ and $\hat{\Omega}'$ (Equations (25) and (26)) may be comparatively computationally expensive as it requires a global maximum search over the sphere. For example, similar to SVD decomposition (block 2220), in PHALCOR this calculation may be required for every $\tau$ on the grid. Similarly, since the OMP algorithm is applied for every detected delay, the computational complexity of the DOA estimation step also increases with the number of delays. Accordingly, separating reflections of different delays may require the processing for each delay.

Comparison to Other Methods

MUSIC and Frequency Smoothing

When $\tau=0$ and $w_j=1$, $\bar{R}(\tau)$ is a frequency-smoothed SCM (as used for example in D. Khaykin and B. Rafaely, "*Coherent signals direction-of-arrival estimation using a spherical microphone array: Frequency smoothing approach,*" in *Proc. IEEE Workshop Appl. Signal Process. Audio Acoust.,* 2009, pp. 221-224 (Khaykin 2009)

Frequency smoothing is a common procedure in source localization in the presence of reverberation, as it can decorrelate signals, which is necessary for subspace methods such as MUSIC. Furthermore, $\bar{R}(\tau)$ is positive semidefinite, and therefore its singular vectors are also eigenvectors, so $\hat{\Omega}'(0)$ is the estimate obtained by MUSIC if the signal subspace dimension is set to 1, and $\rho(0)$ is equivalent to the MUSIC spectrum magnitude at this direction. While the frequency smoothing goal is to decorrelate the sources, PHALCOR actually utilizes this correlation to enhance specific reflections and to derive information about these reflections.

L1-SVD

L1-SVD is used for source localization that can address correlated sources (D. Malioutov, M. Cetin, and A. S. Willsky, "A sparse signal reconstruction perspective for source localization with sensor arrays," IEEE Trans. Signal Process., vol. 53, no. 8, pp. 3010-3022, August 2005 (Malioutov 2005))

L1-SVD is based on the observation that the first eigenvectors of the SCM are linear combinations of steering vectors. The DOAs are estimated by decomposing the eigenvectors of the SCM into a sparse combination of steering vectors. This is similar to our method, which decomposes a first left singular vector of the phase aligned SCM to a sparse linear combination of steering vectors. In general, the performance of sparse recovery methods improves as the vectors are sparser. While in L1-SVD the sparsity is determined by the total number of reflections, in the PHALCOR employed in some embodiments, the sparsity is determined by the number of sources at a specific delay, which is significantly lower. Furthermore, like MUSIC, in L1-SVD the number of detectable sources is limited by the number of input channels ($(N+1)^2$ in our case). In PHALCOR, on the other hand, it is possible to detect more reflections than input channels, as each delay is processed independently.

Generalized Cross Correlation

The relations of PHALCOR to MUSIC and L1-SVD is related only to DOA estimation. However, PHALCOR is also related to delay estimation methods that are based on generalized cross correlation analysis. (J. Hassab and R. Boucher, "*Optimum estimation of time delay by a generalized correlator,*" IEEE Trans. Acoust., Speech, Signal Process., vol. A SSP-27, no. 4, pp. 373-380, August 1979 (Hassab 1979))

It can be shown that the entries of $\bar{R}(\tau)$ contain a generalized cross correlation between each pair of input channels, at lag $\tau$. Although similar, there are some important distinctions between the two methods. While cross correlation analysis is typically used to estimate the delay between two signals that are observed directly, in embodiments, PHALCOR aims to estimate the delay between multiple signals that are observed indirectly where each input channel is a linear combination of the delayed signals, given by the unknown steering matrix, which is estimated as well.

TABLE 2

Comparison of current methods and the way in which these are overcome by employing embodiments of the method and system

| Known Approach | Limitations of known approach | Example advantages of the system and method, according to some embodiments |
|---|---|---|
| Spatial Resolution | Practical arrays have restricted spatial resolution, imposing a limit on the spatial separability of reflections | R(f) is transformed to R($\tau$, f), making M($\tau$, f) sparse, and enhancing one or a few reflections relative to the rest, therefore overcoming the spatial resolution limits. |
| Coherent sources | Room reflections are coherent, see Equation 5, and method like MUSIC may fail, or may require frequency smoothing (H. Wang and M. Kaveh, "Coherent signal-subspace processing for the detection and estimation of angles of arrival of multiple wide-band sources," IEEE Trans. Acoust., Speech, Signal Process., vol. A SS33, no. 4, pp. 823-831, August 1985). The latter process may only decorrelate reflections with different delays | The proposed approach exploits coherency of reflection in an explicit signal model, and does not require de-correlation of source, therefore overcoming this limitation |
| Reflections with similar DOA | Reflections with similar DOA and different delay may not be resolved by methods that rely on spatial separation, such as beamforming and MUSIC | The phase alignment transformation leads to sparse M($\tau$, f) with reflections of different delay $\tau$ contributing to different sparse matrices $\bar{M}(\tau$, f), facilitating estimation of reflections with the same DOA but different delay |
| More reflections than microphones | Current methods may require more microphones than reflections | PHALCOR separates reflections into groups with similar delay. As each group is processed separately, the number of microphones limit the reflections per group, and not the number of reflections in total. |

Simulation Examples

The following section provides further example implementations in conjunction with performed simulations. It is noted that the simulation configurations described herein may be analogously implemented in a real-world scenario.

TABLE 3

| | | | | Average Distance between Source and Array (m) | Average number of reflections with delay smaller than 20 ms |
|---|---|---|---|---|---|
| Room | Dimensions (m) | Reverberation Time (s) | Critical Distance (m) | | |
| Small | $5 \times 4 \times 2.5$ | 0.6 | 0.5 | 1.7 | 52 |
| Medium | $7 \times 5 \times 3$ | 0.8 | 0.7 | 2.5 | 31 |
| Large | $10 \times 7 \times 3.5$ | 1.1 | 1 | 3.8 | 21 | lists room parameters used in the simulation study discussed herein

Simulation Setup

An example simulation study is herein presented, demonstrating the performance of the PHALCOR method, according to some embodiments. First, a detailed analysis of the different steps of the algorithm is presented on a specific test case. Next, a Monte Carlo analysis is presented, demonstrating the robustness of PHALCOR.

The setup of the simulations, common to both the case study and the Monte Carlo study, is as follows. An acoustic scene that consists of a speaker and a rigid spherical microphone array in a shoe box room, was simulated using the image method (Allen et al. 1979). The speech signal is a 5 seconds sample, drawn randomly from the TSP Speech Database (P. Kabal, "*Tsp speech database*," McGill University, Database Version, vol. 1, no. 0, pp. 09-02, 2002 (Kabal 2002)).

The array has 32 microphones, and a radius of 4.2 cm (similar to the Eigenmike (M. Acoustics, "Em32 Eigenmike Microphone Array Release Notes (v17.0)," 25 Summit Ave, Summit, N J 07901, USA, 2013)), facilitating plane wave decomposition with spherical harmonics order N=4. The microphone signals were sampled at 48 kHz. Sensor noise was added, such that the direct sound to noise ratio is 30 dB. The positions of the speaker and the array were chosen at random inside the room, with the restriction that the distance between each other, and to the room boundaries is no less than 1 m. Three different rooms sizes are considered. Their dimensions and several acoustic parameters, are presented in Table 3.

Methodology

The signals recorded by the microphones were used to compute $a_{nm}(f)$. An STFT was applied to the PWAD coefficients signals using a Hanning window of 8192 samples, and an overlap of 75%. A frequency range of [500,5000] Hz was chosen for the analysis. The number of time bins used for averaging, $J_\tau$, was set to 6, while the number of frequency bins used for the phase alignment transform, $J_F$, was set such that $J_F \Delta f = 2000$ Hz. The delay resolution $\Delta\tau$ was set to 83.33 microseconds (equivalent to setting M=2048 in Eq. (32)), while $J\tau$ was chosen such that the maximal delay is 20 ms.

With these parameters, PHALCOR, was applied to the simulated data. The values of the different hyper-parameters of PHALCOR, including $\rho_{min}$, $\epsilon_{\mu 1}$, $S_{max}$, $\gamma\Omega$ and $\gamma_\tau$, were set as exemplified herein above.

The MUSIC algorithm (Khaykin 2009) was applied as a reference method for DOA estimation, by selecting the peaks in the MUSIC spectrum $\|y(\Omega)^H U\|$, where U is a matrix whose columns are orthonormal eigenvectors that correspond to the L largest eigenvalues of the time and frequency smoothed SCM. The time and frequency smoothing parameters are the same as in PHALCOR. The dimension of the signal subspace L was determined using the SORTE method. (K. Han and A. Nehorai, "*Improved source number detection and direction estimation with nested arrays and ulas usingjackknifng,*" IEEE Trans.Signal Process., vol. 61, no. 23, pp. 6118-6128, December 2013).

To reduce false positives, peaks for which the MUSIC magnitude height is lower than 0.75 were discarded. The local estimates were clustered using DBSCAN, to obtain global estimates. The delays of the detected reflections were estimated using the following method. First, each reflection signal was estimated by solving Eq. (6) for s in the least squares sense. Then, the delay of the k'th reflections was estimated by selecting the maximum of the cross correlation values between $s_k$ and $s_0$. Note that in contrast to PHALCOR, the delays are estimated after the clustering.

For both PHALCOR and the reference method, a detected reflection as a true positive was considered if its delay and DOA matched simultaneously the delay and DOA of a true reflection. The matching tolerance was chosen to be 500 µs for the delay, and 15 degrees for the DOA. The probability of detection (PD) at a given maximal delay t is defined as the fraction of true positive detections of reflections r with a delay smaller than or equal to t, out of the total number of reflections with a delay smaller than or equal to t:

$$PD_t \triangleq \frac{|\{r \in \mathcal{D} : r \text{ is true positive with delay} \leq t\}|}{|\{r \in \mathcal{GT} : r \text{ has delay} \leq t\}|} \tag{33}$$

where GT is the set of all ground truth reflections, and D is the set of all estimated reflections. The false positive rate (FPR) at a given maximal delay t is defined as the fraction of false positive detections with a delay smaller than or equal to t, out of the total number of detections with a delay smaller than or equal to t:

The false positive rate (FPR) at a given maximal delay t is defined as the fraction of false positive detections with a delay smaller than or equal to t, out of the total number of detections with a delay smaller than or equal to t:

$$FPR_t \triangleq \frac{|\{r \in \mathcal{D} : r \text{ is false positive with delay} \leq t\}|}{|\{r \in \mathcal{D} : r \text{ has delay} \leq t\}|} \tag{34}$$

Here, |•| denotes the cardinality of the set.

Results of a Case Study

Figures 3A, 3B:
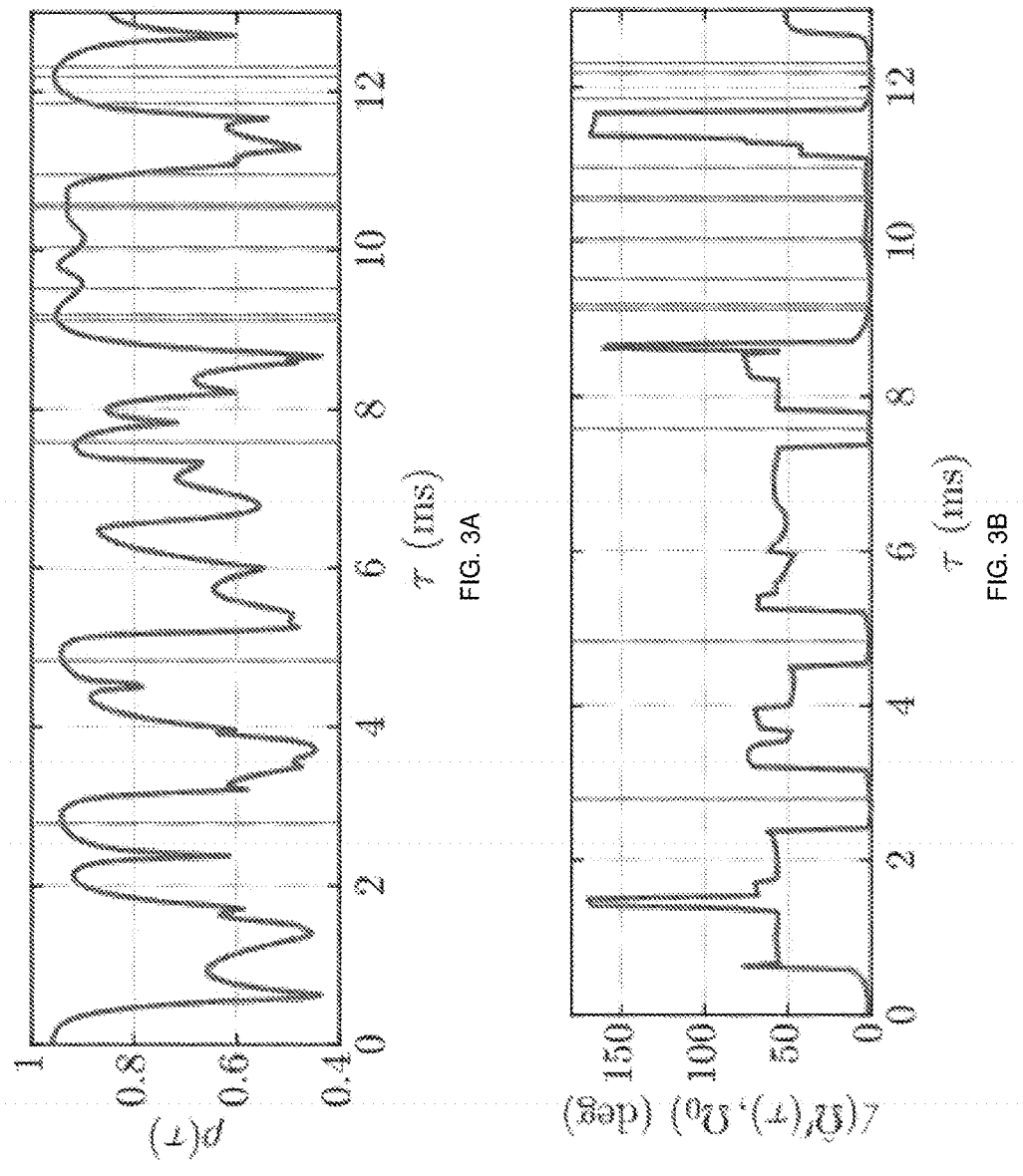
FIG. 3A shows matching criterion threshold $\rho$ as a function of delay $\tau$ (Equation 25), according to some embodiments.
FIG. 3B shows the angle between $\hat{\Omega}'(\tau)$ (Equation (26)) and true direction of the direct sound, as a function of $\tau$, and in which the red vertical lines correspond to the true delays of the reflections, according to some embodiment.

The test case presented in this section is of a female speaker in the medium sized room. There are K=31 reflections with a delay less than 20 ms in this case. FIGS. 3a and 3b illustrate the delay detection routine. FIG. 3A shows ρ as a function of τ. Since $\rho(\tau)$ measures the similarity between $v_\tau$, a first right singular vector of $R^-(\tau)$, and a steering vector (see Eq. (25)), it is high for values of τ that are close to a reflection's delay, indicated on the plot using red vertical lines. There are also values of τ that are not close to a reflection's delay, for which $\rho(\tau)$ is high.

These correspond to delays between two reflections (as opposed to delays between a reflection and the direct sound). For example, the peak near τ=2 ms, corresponds to the delay between the second and third reflections, whose delays are about 3 ms and 5 ms, respectively. Such cases may be identified by testing $\angle(\hat{\Omega}'(\tau), \Omega_0)$, the angle between the DOA of the steering vector that is most similar to $v_\tau$, and the DOA of the direct sound. As shown in FIG. 3B, $\angle(\hat{\Omega}'(\tau), \Omega_0)$ is small for values of $\tau$ which are close to a reflection's delay, and high otherwise. Therefore, false detections such as $\tau=2$ ms, will be discarded during the first step of the second part of the algorithm.

Figure 4:
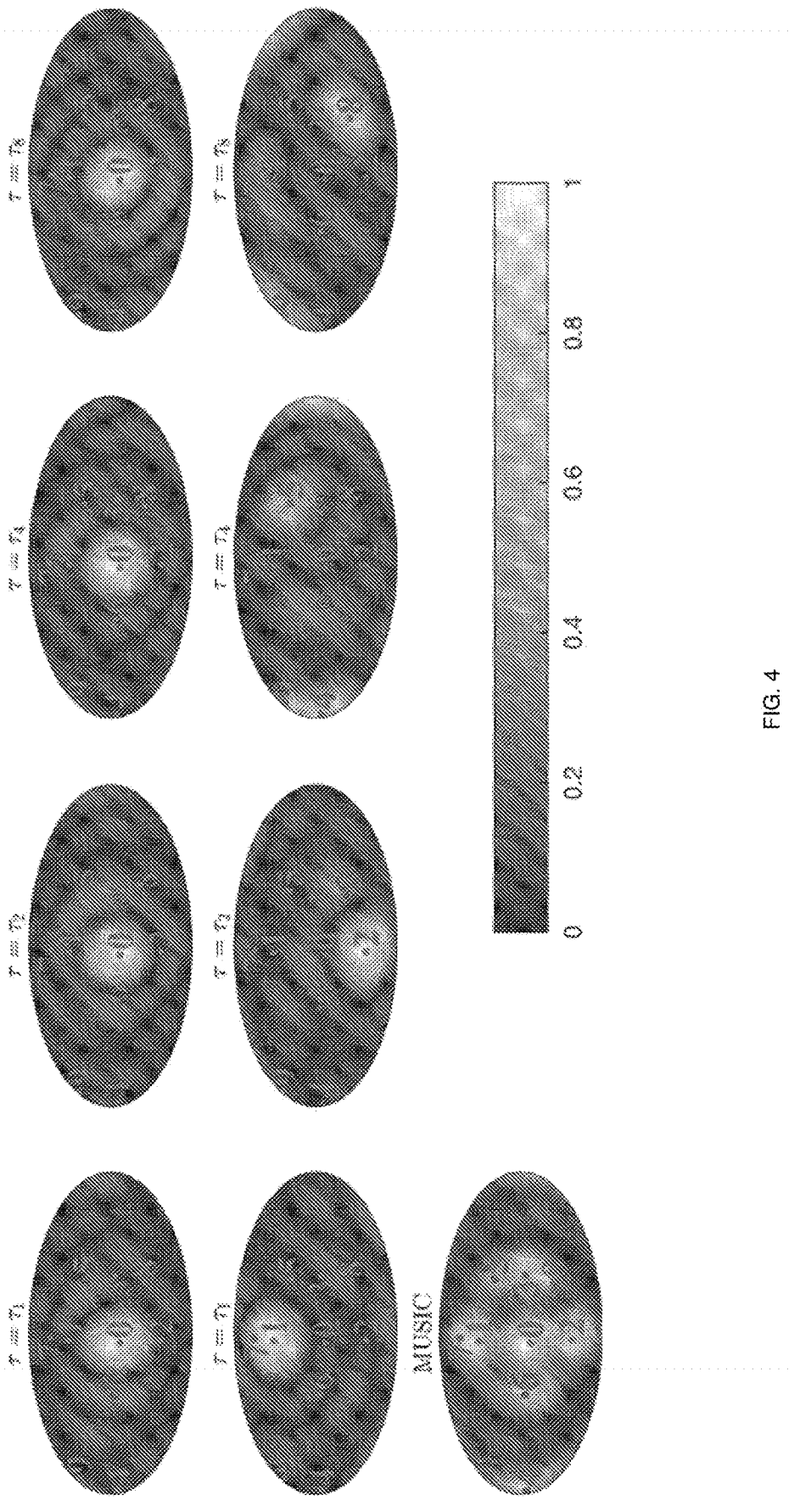
FIG. 4 schematically illustrates the process of Direction of Arrival (DOA) estimation, according to some embodiments.

FIG. 4 schematically illustrates the process of DOA estimation, according to some embodiments. Each plot shows a different function on the sphere, which is projected onto the 2D page using the Hammer projection. The red markers correspond to ground truth DOAs $\Omega_0, \ldots, \Omega_9$, with the numbers indicating the index.

In the top row, the function $|y(\Omega)v\tau|$ is shown, where each column corresponds to a different value of $\tau$. When $\tau$ equals a reflection's delay, the direction that maximizes the response is excepted to be that of the direct sound. Indeed, as $\tau$ varies across columns, the location of the peak remains, and is equal to $\Omega_0$, the DOA of the direct sound.

In the middle row, the function $|y(\Omega)u_r|$ is shown. It is similar to the top row, except that a first left singular vector is used instead of a right one. When r is a reflection's delay $u_r$ is approximately equal to a linear combination of the steering vectors of reflections with delays of approximately $\tau$. When the DOAs are sufficiently separated, they can be identified as peaks in $|y(\Omega)u_r|$. For $\tau_1$ and $\tau_2$, only one such peak is apparent, and its location matches the DOA of the corresponding reflection. When $\tau=\tau_4$, it is apparent that there are two dominant peaks, at directions $\Omega_4$ and $\Omega_5$. This is due to the fact that the 4th and 5th reflections have similar delays. Similarly, since the 8th and 9th reflections have similar delays, when $\tau=\tau_8$ the two peaks correspond to $\Omega_8$ and $\Omega_9$.

FIG. 4 demonstrates the effectiveness of PHALCOR in separating reflections from the direct sound, as well as reflections with different delays. This is in contrast to the MUSIC spectrum (shown in bottom row of FIG. 4), which shows only a few peaks, which are much less separable; as a result, fewer reflections are potentially identified.

Figure 5:
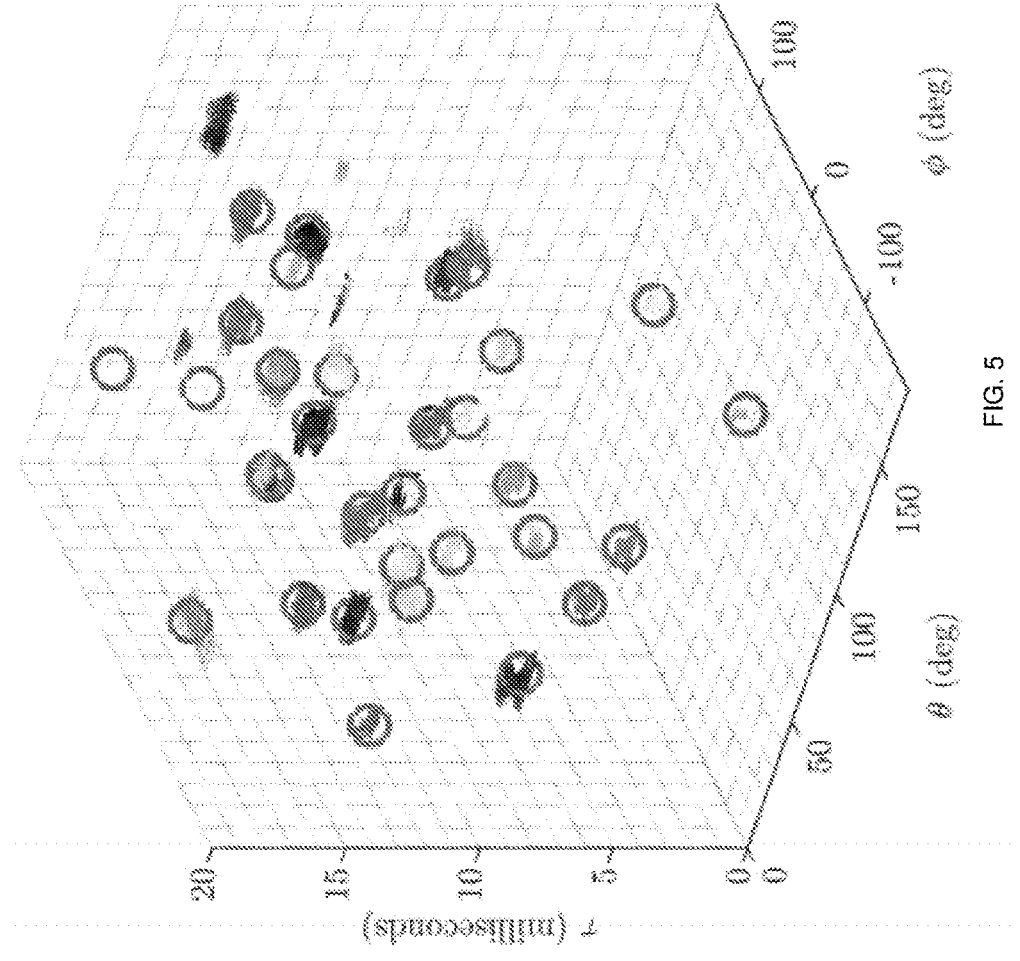
FIG. 5 depicts local DOA estimates and delay estimates obtained by PHALCOR, according to some embodiments.
Figure 6:
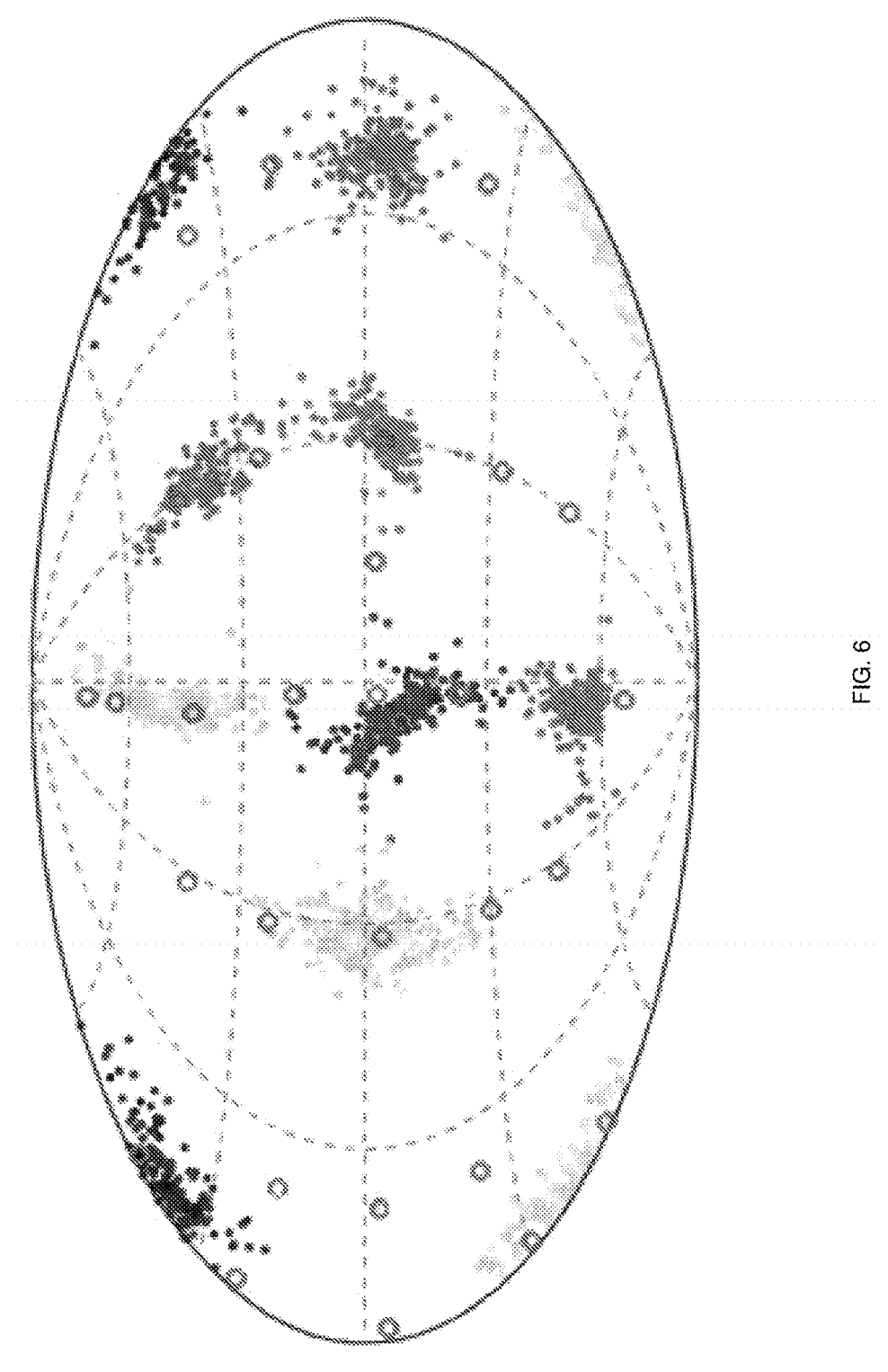
FIG. 6 depicts local DOA estimates obtained by MUSIC.

FIGS. 5 and 6 present the local estimates obtained with PHALCOR and the reference methods, respectively. DOA and delay estimates are colored by assigned cluster number.

In FIG. 5, the $\theta$ and $\varphi$ axes are for elevation and azimuth, respectively. The red circles correspond to true DOAs and delays. In FIG. 6, The red circles correspond to $\Omega 0, \ldots, \Omega 31$. The Hammer projection is used to project the sphere onto the plane.

It is apparent that, compared to the reference, in the example discussed, PHALCOR is able to detect significantly more reflections. PHALCOR detected successfully 29 reflections, while the MUSIC based method could only detect 8 (not including the direct sound). Furthermore, FIGS. 5 and 6 illustrate the advantage of simultaneously estimating DOA and delay for cluster analysis.

Finally, we note that while the performance of the proposed method is superior, the difference in computation time is quite significant: 303 seconds for the proposed method, and only 19 seconds for the reference method (as obtained using MATLAB 2020a, on a MacBook Pro 2019 with a 2.3 GHz 8-Core Intel Core i9 processor, 16 GB RAM).

Monte Carlo Analysis

TABLE 4

Average estimation errors for the entire Monte Carlo simulation

| Method | DOA Error RMS (deg) | Delay Error RMS (µs) | Average Number of True Positive Detection |
|---|---|---|---|
| PHALCOR | 4.3 | 77 | 24.8 |
| Reference | 6.5 | 43 | 3.8 |

The simulation described above is repeated 50 times for each of the 3 rooms, varying the speakers, their location, and the microphone array location.

Figure 7:
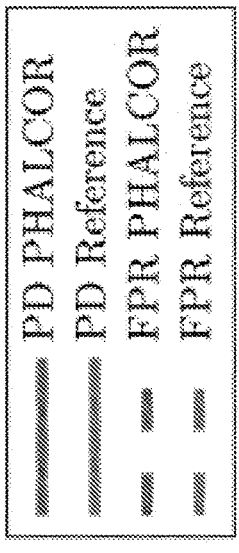
FIG. 7 illustrates probability of detection (PD) and the false positive rate (FPR) of PHALCOR and the reference method.
Figure 7:
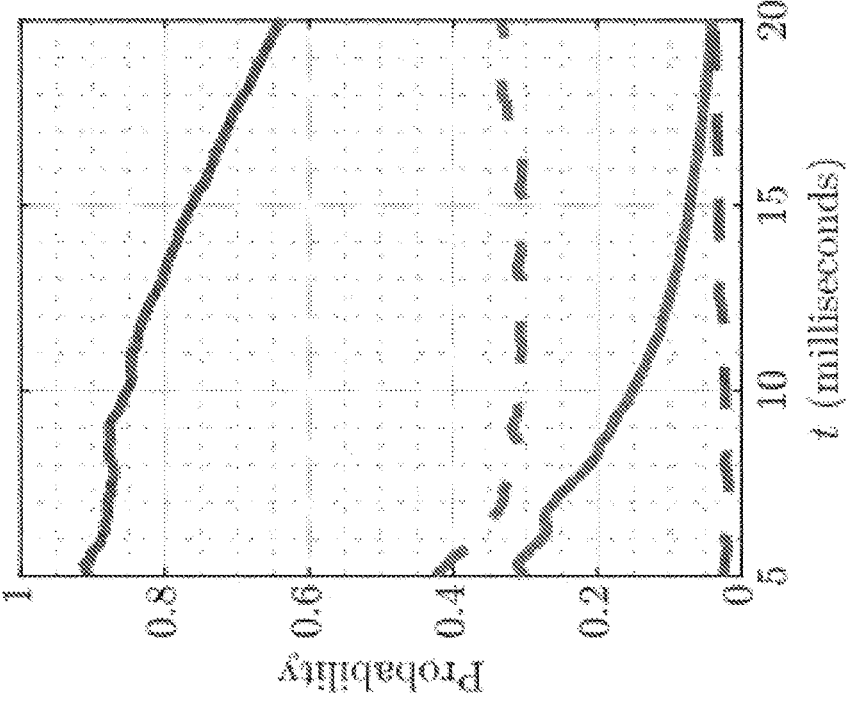

FIG. 7 presents PD and FPR, for different values of t, the maximum delay of the identified reflections.

Compared with the reference method, the performance of PHALCOR is significantly better, both in terms of probability of detection and false positive rates, by a factor ranging from 3 to 20. As the delay of a reflection increases, the probability of detection decreases. This is since later reflections usually have lower amplitudes. Furthermore, the reflection density is higher as the delay increases, making it more difficult to separate the reflections spatially.

Figure 8:
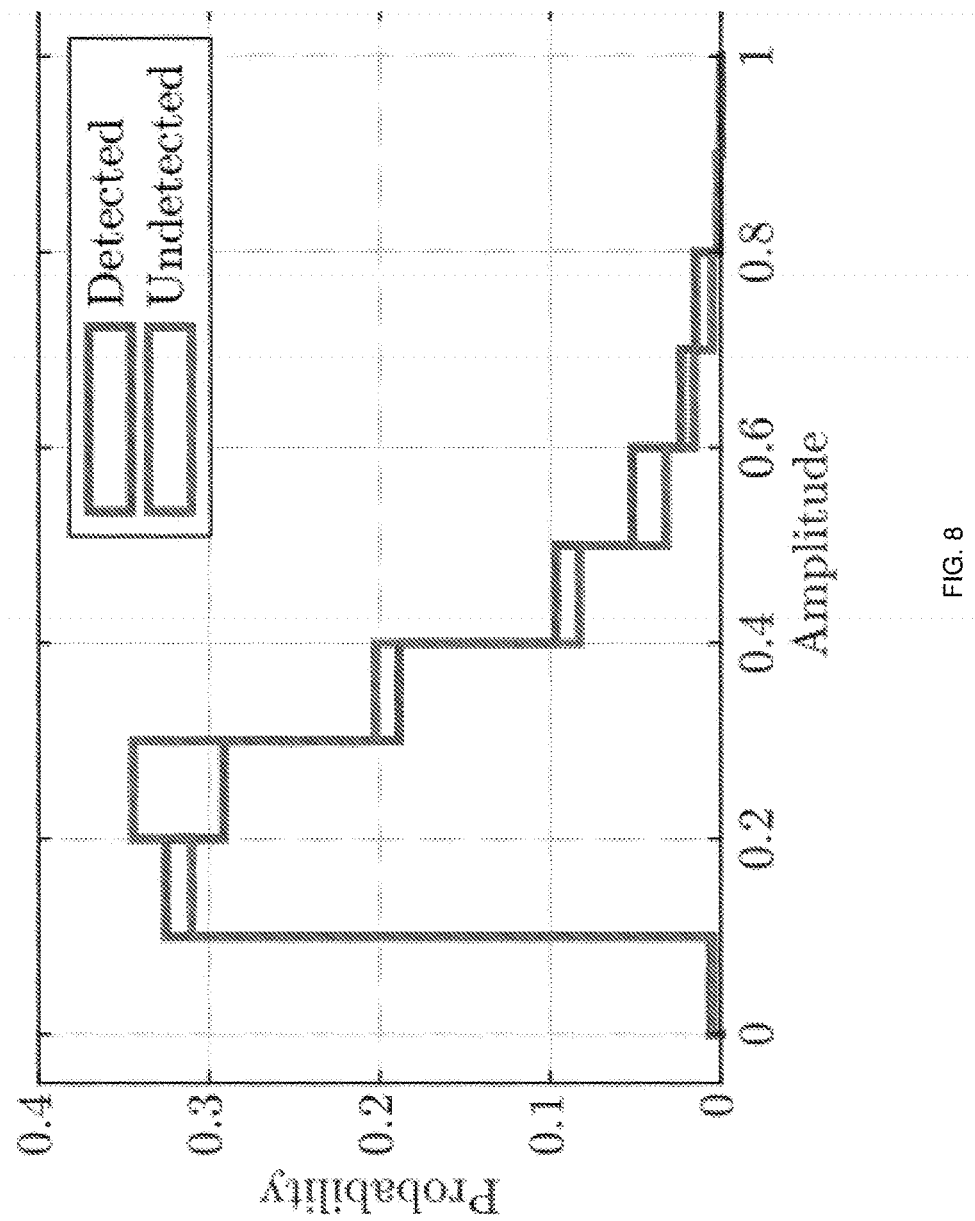
FIG. 8 shows a Histogram of reflection amplitudes for detected reflections and undetected reflections, according to some embodiments.
Figure 9:
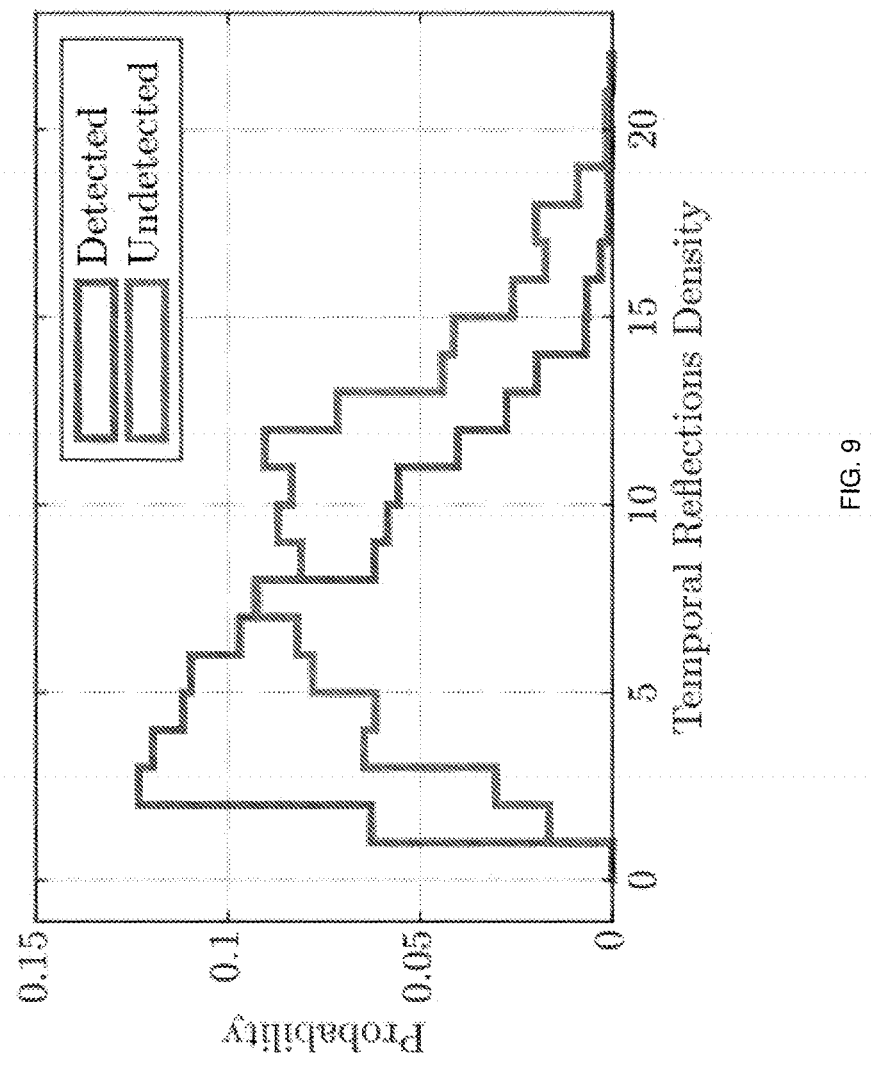
FIG. 9 shows a Histogram of reflection temporal densities for detected reflections and undetected reflections, according to some embodiments.

FIGS. 8 and 9 show how the distribution of reflection amplitudes and reflection temporal densities vary between detected and undetected reflections. Here, we define the temporal density of a reflection with a delay $\tau$ as the number of reflections with a delay within 1 ms of $\tau$. The amplitudes are normalized such that the direct sound amplitude is 1. As is evident, detected reflections tend to be of higher amplitude, and lower temporal density, compared to undetected reflections. It is also apparent that this effect is more significant for temporal density.

The root mean square (RMS) for DOA and delay estimation errors for each method are computed and averaged for all the estimates in this Monte Carlo simulation, and are presented in Table 4. The RMS is calculated excluding the direct sound. Table 4 shows that the performance in terms of DOA estimation error is comparable between the two methods. In terms of delay estimation error, the reference method is superior, but note that the errors are calculated only on true positive detections, which are considerably more frequent in PHALCOR, as is evident from FIG. 7 and the last column of Table 4. Furthermore, in applications where high delay accuracy is important, it may be possible to apply cross correlation (as in the reference method) for delay estimation as a post processing step of PHALCOR.

Figure 10:
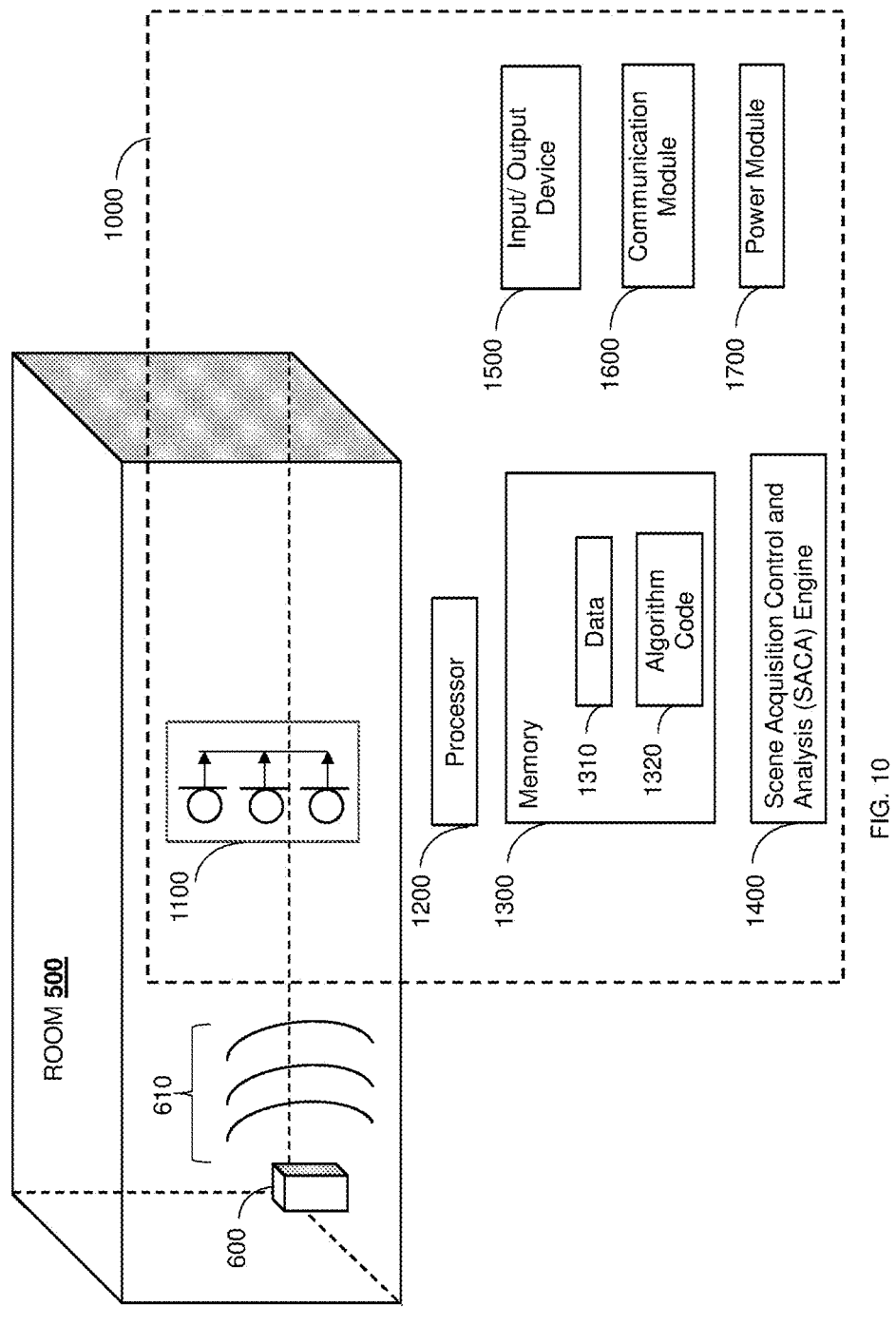
FIG. 10 is a schematic illustrations of a system configured to estimate direction of arrival and delays of early room reflections, according to some embodiments.

Reference is now made to FIG. 10. In some embodiments, a system 1000 for estimating direction of arrival and delays of early room reflections may include a microphone array 1100 configured to capture sound waves 610 that are output by a speaker 600 located in a room 500. System 1000 may further include a processor 1200, a memory 1300 that is configured to store data 1310 and algorithm code 1320. Processor 1200 may be configured to execute algorithm code 1320 for the processing of data 1310 resulting in the implementation of a reflection and DOA analysis (RDOA) engine 1400. RDOA engine 1400 may be configured to implement the method outlined herein.

The term "processor", as used herein, may additionally or alternatively refer to a controller. Processor 1200 may be implemented by various types of processor devices and/or processor architectures including, for example, embedded processors, communication processors, graphics processing unit (GPU)-accelerated computing, soft-core processors, quantum processors, and/or general purpose processors.

Memory 1300 may be implemented by various types of memories, including transactional memory and/or long-term storage memory facilities and may function as file storage, document storage, program storage, or as a working memory. The latter may for example be in the form of a static random access memory (SRAM), dynamic random access memory (DRAM), read-only memory (ROM), cache and/or flash memory. As working memory, memory 1300 may, for example, include, e.g., temporally-based and/or non-temporally based instructions. As long-term memory, memory 1300 may for example include a volatile or non-volatile computer storage medium, a hard disk drive, a solid state drive, a magnetic storage medium, a flash memory and/or other storage facility. A hardware memory facility may for example store a fixed information set (e.g., software code) including, but not limited to, a file, program, application, source code, object code, data, and/or the like.

System 1000 may further include an input/output device 1500 which may be configured to provide or receive any type of data or information. Input/output device 1500 may include, for example, visual presentation devices or systems such as, for example, computer screen(s), head mounted display (HMD) device(s), first person view (FPV) display device(s), device interfaces (e.g., a Universal Serial Bus interface), and/or audio output device(s) such as, for example, speaker(s) and/or earphones. Input/output device 1500 may be employed to access information generated by the system and/or to provide inputs including, for instance, control commands, operating parameters, queries and/or the like. For example, input/output device 1500 may allow a user of system 1000 to view and/or otherwise receive information of at least one (early) reflection and its associated DOA.

System 1000 may further comprise at least one communication module 1600 configured to enable wired and/or wireless communication between the various components and/or modules of the system and which may communicate with each other over one or more communication buses (not shown), signal lines (not shown) and/or a network infrastructure.

System 1000 may further include a power module 1700 for powering the various components and/or modules and/or subsystems of the system. Power module 1700 may comprise an internal power supply (e.g., a rechargeable battery) and/or an interface for allowing connection to an external power supply.

It will be appreciated that separate hardware components such as processors and/or memories may be allocated to each component and/or module of system 1000. However, for simplicity and without be construed in a limiting manner, the description and claims may refer to a single module and/or component. For example, although processor 1200 may be implemented by several processors, the following description will refer to processor 1200 as the component that conducts all the necessary processing functions of system 1000.

Functionalities of system 1000 may be implemented fully or partially by a multifunction mobile communication device also known as "smartphone", a mobile or portable device, a non-mobile or non-portable device, a digital video camera, a personal computer, a laptop computer, a tablet computer, a server (which may relate to one or more servers or storage systems and/or services associated with a business or corporate entity, including for example, a file hosting service, cloud storage service, online file storage provider, peer-to-peer file storage or hosting service and/or a cyber-locker), personal digital assistant, a workstation, a wearable device, a handheld computer, a notebook computer, a vehicular device, a non-vehicular device, a robot, a stationary device and/or a home appliances control system. For example, microphone array 1100 may be part of a smartphone camera or of an autonomous or semi-autonomous vehicle, and some of RDOA engine 1400 functionalities may be implemented by the smartphone or the vehicle, and some by devices and/or system external to the smartphone or vehicle. Alternative configurations may also be conceived.

Reference is now made to FIG. 11. According to some embodiments, a method for estimating direction of arrival and delays of reflected and non-reflected sound waves in a room received by a plurality of sound capturing devices located in the room, may comprise obtaining sound data descriptive of non-reflected and reflected sound waves in a room, the sound waves containing a plurality of frequencies (block 11100). In some examples, the method sound data may be generated based on electronic signals generated by the plurality of sound capturing devices. In some examples, the plurality of sound capturing devices may be employed by a microphone array.

In some embodiments, the method may further include determining, based on the sound data, a correlation value between at least two audio channels of a plurality of audio channels to obtain, for a same frequency of the plurality of frequencies, a set of correlation values (e.g., a 3D correlation matrix) (block 11200).

In some embodiments, the method may include performing inverse weighted Fourier transform on each set of frequency-related correlation values to obtain a plurality of subsets of delay representations composing a set of values represented in a 3D delay matrix) (block 11300). Each subset of delay representation may relate to a different time delay between two received sound waves.

In some embodiments, the method may further include analyzing each subset of time delay representations to extract, for a selected delay, information about the non-reflected and reflected sources to obtain a set of linear combinations of the sources (block 11400). Each linear combination may pertain to a same or substantially same delay.

In some embodiments, the method may include analyzing the set to identify at least one reflection at a given delay (block 11500). In some examples, the set of values may represent linear combinations of a direct source and at least one reflection or of a plurality of reflections. In some examples, the analyzing may be performed to differentiate between at least two reflections of a selected linear combination having an about same delay.

In some embodiments, the method may include determining, for the at least one identified reflection at the given delay, a direction-of-arrival (DOA) estimate (block 11600). This may for instance be performed by determining or searching for a match for the at least one identified reflection with steering vectors to estimate the respective DOA. In some examples, the method may include determining which of the at least two obtained differentiated reflections and their associated delays match with steering vectors, to estimate their DOAs (e.g., respectively).

Additional Examples

Example 1 pertains to a method for estimating direction of arrival and delays of reflected and non-reflected sound waves in a room received by a plurality of sound capturing devices in the room, the method comprising:

obtaining sound data descriptive of received sound waves containing a plurality of frequencies;

determining, based on the sound data, a correlation value between each two audio channels of a plurality of audio channels to obtain, for a same frequency of the plurality of frequencies, a set of correlation values;

performing a transform on each set of frequency-related correlation values to obtain a plurality of subsets of delay representations of a 3D Matrix, each subset of delay representations relates to a different time delay between two received sound waves;

analyzing each set of time delay representations to:
extract information about the non-reflected sound wave;
  and
obtain a set of linear combinations of reflections having a
  same or substantially same delay relative to the non-
  reflected sound wave; and.
analyzing the setof linear combinations of reflections to
  identify at least one reflection at a given delay. Option-
  ally, the method of example 1 may further include
  determining a match for the at least one reflection with
  a steering vector to estimate the direction-of-arrival
  (DOA) of the at least one reflection.

Example 2 includes the subject matter of example 1 and,
optionally, performing clustering on the reflection data infor-
mation for identifying outliers and clusters.

Example 3 includes the subject matter of example 1
and/or example 2 and, optionally, wherein analyzing each
set of time delay representations is performed using SVD
decomposition.

Example 4 includes the subject matter of any one or more
of the examples 1 to 3 and, optionally, the method of any one
or more of the preceding claims, wherein the step of
analyzing the set of linear combinations of reflections is
performed using a sparse recovery algorithm.

Example 5 includes the subject matter of example 4 and,
optionally, wherein the sparse recovery algorithm is an
orthogonal matching pursuit (OMP) algorithm.

Example 6 includes the subject matter of any one or more
of the examples 1 to 5 and, optionally, wherein the sound
data are created based on electronical signals generated by
a microphone array located in the room.

Example 7 includes the subject matter of any one or more
of the examples 1 to 6 and, optionally, wherein the sound
waves are produced by at least one speaker located in the
room.

Example 8 includes the subject matter of any one or more
of the examples 1 to 7 and, optionally, comprising deter-
mining a match for a plurality of reflections with a plurality
of steering vectors, respectively to estimate the direction-
of-arrival (DOA) for the plurality of reflections.

Example 9 includes the subject matter of any one or more
of the examples 1 to 8 and, optionally, wherein the reflec-
tions are early room reflections.

Example 10 includes the subject matter of example 9 and,
optionally, wherein the early room reflections pertain to the
1st reflection (only), the first two room reflections (only), the
first 3 room reflections (only), or up to the first 10 or 20 room
reflections.

Example 11 pertains to a system for estimating direction
of arrival and delays of reflected and non-reflected sound
waves in a room received by a plurality of sound capturing
devices in the room, the system comprising:
  a processor; and
  a memory storing instructions that are executable by the
    processor to cause the system to perform the following
    steps:
  obtaining sound data descriptive of received sound waves
    containing a plurality of frequencies;
  determining, based on the sound data, a correlation value
    between each two audio channels of a plurality of audio
    channels to obtain, for a same frequency of the plurality
    of frequencies, a set of correlation values;
  performing a transform on each set of frequency-related
    correlation values to obtain a plurality of subsets of
    delay representations of a 3D Matrix, each subset of
    delay representations relates to a different time delay
    between two received sound waves;

analyzing each set of time delay representations to:
extract information about the non-reflected sound wave;
  and
obtain a set of linear combinations of reflections having a
  same or substantially same delay relative to the non-
  reflected sound wave; and
analyzing the set of linear combinations of reflections to
  identify at least one reflection at a given delay. Option-
  ally, Example 11 may further include determining a
  match for the at least one reflection with a steering
  vector to estimate the direction-of-arrival (DOA) of the
  at least one reflection.

Example 12 includes the subject matter of example 11
and, optionally, performing clustering on the reflection data
information for identifying outliers and clusters.

Example 13 includes the subject matter of examples 11
and/or 12 and, optionally, wherein the analyzing of each set
of time delay representations is performed using SVD
decomposition.

Example 14 includes the subject matter of any one or
more of the examples 11 to 13 and, optionally, wherein the
step of analyzing the set of linear combinations of reflections
is performed using a sparse recovery algorithm.

Example 15 includes the subject matter of example 14
and, optionally, wherein the sparse recovery algorithm is an
orthogonal matching pursuit (OMP) algorithm.

Example 16 includes the subject matter of any one or
more of the examples 11 to 15 and, optionally, wherein the
sound data are created based on electronical signals gener-
ated by a microphone array located in the room.

Example 17 includes the subject matter of any one or
more of the examples 11 to 16 and, optionally, wherein the
sound waves are produced by at least one speaker located in
the room.

Example 18 includes the subject matter of any one or
more of the examples 11 to 17 and, optionally, determining
a match for a plurality of reflections with a plurality of
steering vectors, respectively to estimate the direction-of-
arrival (DOA) for the plurality of reflections.

Example 19 includes the subject matter of any one or
more of the examples 11 to 18 and, optionally, wherein the
reflections are early room reflections.

Example 20 includes the subject matter of example 19
and, optionally, wherein the early room reflections contain
the 1st reflection, the first two room reflections, the first 3
room reflections, or up to the first 10 or 20 room reflections.

It is important to note that the methods described herein
and illustrated in the accompanying diagrams shall not be
construed in a limiting manner. For example, methods
described herein may include additional or even fewer
processes or operations in comparison to what is described
herein and/or illustrated in the diagrams. In addition, method
steps are not necessarily limited to the chronological order
as illustrated and described herein.

Any digital computer system, unit, device, module and/or
engine exemplified herein can be configured orotherwise
programmed to implement a method disclosed herein, and to
the extent that the system, module and/or engine is config-
ured to implement such a method, it is within the scope and
spirit of the disclosure. Once the system, module and/or
engine are programmed to perform particular functions
pursuant to computer readable and executable instructions
from program software that implements a method disclosed
herein, it in effect becomes a special purpose computer
particular to embodiments of the method disclosed herein.
The methods and/or processes disclosed herein may be
implemented as a computer program product that may be tangibly embodied in an information carrier including, for example, in a non-transitory tangible computer-readable and/or non-transitory tangible machine-readable storage device. The computer program product may directly loadable into an internal memory of a digital computer, comprising software code portions for performing the methods and/or processes as disclosed herein.

The methods and/or processes disclosed herein may be implemented as a computer program that may be intangibly embodied by a computer readable signal medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer or machine-readable storage device and that can communicate, propagate, or transport a program for use by or in connection with apparatuses, systems, platforms, methods, operations and/or processes discussed herein.

The terms "non-transitory computer-readable storage device" and "non-transitory machine-readable storage device" encompasses distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by one or more communication networks.

These computer readable and executable instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable and executable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable and executable instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The term "engine" may comprise one or more computer modules, wherein a module may be a self-contained hardware and/or software component that interfaces with a larger system. A module may comprise a machine or machines executable instructions. A module may be embodied by a circuit or a controller programmed to cause the system to implement the method, process and/or operation as disclosed herein. For example, a module may be implemented as a hardware circuit comprising, e.g., custom VLSI circuits or gate arrays, an Application-specific integrated circuit (ASIC), off-the-shelf semiconductors such as logic chips, transistors, and/or other discrete components. A module may also be implemented in programmable hardware devices such as field programmable gate arrays, programmable array logic, programmable logic devices and/or the like.

The term "random" also encompasses the meaning of the term "substantially randomly" or "pseudo-randomly".

The expression "real-time" as used herein generally refers to the updating of information based on received data, at essentially the same rate as the data is received, for instance, without user-noticeable judder, latency or lag.

In the discussion, unless otherwise stated, adjectives such as "substantially" and "about" that modify a condition or relationship characteristic of a feature or features of an embodiment of the invention, are to be understood to mean that the condition or characteristic is defined to within tolerances that are acceptable for operation of the embodiment for an application for which it is intended.

Unless otherwise specified, the terms "substantially", "about" and/or "close" with respect to a magnitude or a numerical value may imply to be within an inclusive range of $-10\%$ to $+10\%$ of the respective magnitude or value.

It is important to note that the method may include is not limited to those diagrams or to the corresponding descriptions. For example, the method may include additional or even fewer processes or operations in comparison to what is described in the figures. In addition, embodiments of the method are not necessarily limited to the chronological order as illustrated and described herein.

Discussions herein utilizing tens such as, for example, "processing", "computing", "calculating", "determining", "establishing", "analyzing", "checking", "estimating", "deriving", "selecting", "inferring" or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. The term determining may, where applicable, also refer to "heuristically determining".

It should be noted that where an embodiment refers to a condition of "above a threshold", this should not be construed as excluding an embodiment referring to a condition of "equal or above a threshold". Analogously, where an embodiment refers to a condition "below a threshold", this should not be construed as excluding an embodiment referring to a condition "equal or below a threshold". It is clear that should a condition be interpreted as being fulfilled if the value of a given parameter is above a threshold, then the same condition is considered as not being fulfilled if the value of the given parameter is equal or below the given threshold. Conversely, should a condition be interpreted as being fulfilled if the value of a given parameter is equal or above a threshold, then the same condition is considered as not being fulfilled if the value of the given parameter is below (and only below) the given threshold.

It should be understood that where the claims or specification refer to "a" or "an" element and/or feature, such reference is not to be construed as there being only one of that element. Hence, reference to "an element" or "at least one element" for instance may also encompass "one or more elements".

Terms used in the singular shall also include the plural, except where expressly otherwise stated or where the context otherwise requires.

In the description and claims of the present application, each of the verbs, "comprise" "include" and "have", and conjugates thereof, are used to indicate that the data portion or data portions of the verb are not necessarily a complete listing of components, elements or parts of the subject or subjects of the verb.

Unless otherwise stated, the use of the expression "and/or" between the last two members of a list of options for selection indicates that a selection of one or more of the listed options is appropriate and may be made. Further, the use of the expression "and/or" may be used interchangeably with the expressions "at least one of the following", "any one of the following" or "one or more of the following", followed by a listing of the various options.

As used herein, the phrase "A,B,C, or any combination of the aforesaid" should be interpreted as meaning all of the following: (i) A or B or C or any combination of A, B, and C, (ii) at least one of A, B, and C; (iii) A, and/or B and/or C, and (iv) A, B and/or C. Where appropriate, the phrase A, B and/or C can be interpreted as meaning A, B or C. The phrase A, B or C should be interpreted as meaning "selected from the group consisting of A, B and C". This concept is illustrated for three elements (i.e., A,B,C), but extends to fewer and greater numbers of elements (e.g., A, B, C, D, etc.).

It is appreciated that certain features of the invention, which are, for clarity, described in the context of separate embodiments or example, may also be provided in combination in a single embodiment. Conversely, various features of the invention, which are, for brevity, described in the context of a single embodiment, example and/or option, may also be provided separately or in any suitable sub-combination or as suitable in any other described embodiment, example or option of the invention. Certain features described in the context of various embodiments, examples and/or optional implementation are not to be considered essential features of those embodiments, unless the embodiment, example and/or optional implementation is inoperative without those elements.

It is noted that the terms "in some embodiments", "according to some embodiments", "for example", "e.g.", "for instance" and "optionally" may herein be used interchangeably.

The number of elements shown in the Figures should by no means be construed as limiting and is for illustrative purposes only.

"Real-time" as used herein generally refers to the updating of information at essentially the same rate as the data is received. More specifically, in the context of the present invention "real-time" is intended to mean that the image data is acquired, processed, and transmitted from a sensor at a high enough data rate and at a low enough time delay that when the data is displayed, data portions presented and/or displayed in the visualization move smoothly without user-noticeable judder, latency or lag.

It is noted that the terms "operable to" can encompass the meaning of the term "modified or configured to". In other words, a machine "operable to" perform a task can in some embodiments, embrace a mere capability (e.g., "modified") to perform the function and, in some other embodiments, a machine that is actually made (e.g., "configured") to perform the function.

Throughout this application, various embodiments may be presented in and/or relate to a range format. It should be understood that the description in range format is merely for convenience and brevity and should not be construed as an inflexible limitation on the scope of the embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

While the invention has been described with respect to a limited number of embodiments, these should not be construed as limitations on the scope of the invention, but rather as exemplifications of some of the embodiments.

What is claimed is:

1. A method for estimating direction of arrival and delays of reflected and non-reflected sound waves in a room received by a plurality of sound capturing devices in the room, the method comprising:

obtaining sound data descriptive of received sound waves containing a plurality of frequencies;

determining, based on the sound data, a correlation value between each two audio channels of a plurality of audio channels to obtain, for a same frequency of the plurality of frequencies, a set of correlation values;

performing a transform on each set of frequency-related correlation values to obtain a plurality of subsets of delay representations of a 3D Matrix, each subset of delay representations relates to a different time delay between two received sound waves;

analyzing each set of time delay representations to:

extract information about the non-reflected sound wave; and obtain a set of linear combinations of reflections having a same or substantially same delay relative to the non-reflected sound wave; and analyzing the set of linear combinations of reflections to identify at least one reflection at a given delay, wherein the at least one reflection is a blind estimated reflection.

2. The method of claim 1, further comprising determining a match for the at least one reflection with a steering vector to estimate the direction-of-arrival (DOA) of the at least one reflection.

3. The method of claim 1, further comprising performing clustering on the reflection data information for identifying outliers and clusters.

4. The method of claim 1, wherein analyzing each set of time delay representations is performed using SVD decomposition.

5. The method of claim 1, wherein the step of analyzing the set of linear combinations of reflections is performed using a sparse recovery algorithm.

6. The method of claim 5, wherein the sparse recovery algorithm is an orthogonal matching pursuit (OMP) algorithm.

7. The method of claim 1, wherein the sound data are created based on electronical signals generated by a microphone array located in the room.

8. The method of claim 1, wherein the sound waves are produced by at least one speaker located in the room.

9. The method of claim 1, comprising determining a match for a plurality of reflections with a plurality of steering vectors, respectively to estimate the direction-of-arrival (DOA) for the plurality of reflections.

10. The method of claim 1, wherein the reflections are early room reflections.

11. A system for estimating direction of arrival and delays of reflected and non-reflected sound waves in a room received by a plurality of sound capturing devices in the room, the system comprising:

a processor; and a memory storing instructions that are executable by the processor to cause the system to perform the following steps:

obtaining sound data descriptive of received sound waves containing a plurality of frequencies;

determining, based on the sound data, a correlation value between each two audio channels of a plurality of audio channels to obtain, for a same frequency of the plurality of frequencies, a set of correlation values;

performing a transform on each set of frequency-related correlation values to obtain a plurality of subsets of delay representations of a 3D Matrix, each subset of delay representations relates to a different time delay between two received sound waves;

analyzing each set of time delay representations to:

extract information about the non-reflected sound wave; and obtain a set of linear combinations of reflections having a same or substantially same delay relative to the non-reflected sound wave; and analyzing the set of linear combinations of reflections to identify at least one reflection at a given delay, wherein the at least one reflection is a blind estimated reflection.

12. The system of claim 11, wherein the steps further comprise determining a match for the at least one reflection with a steering vector to estimate the direction-of-arrival (DOA) of the at least one reflection.

13. The system of claim 11 or 12, further comprising performing clustering on the reflection data information for identifying outliers and clusters.

14. The system of claim 11, wherein analyzing each set of time delay representations is performed using SVD decomposition.

15. The system of claim 11, wherein the step of analyzing the set of linear combinations of reflections is performed using a sparse recovery algorithm.

16. The system of claim 15, wherein the sparse recovery algorithm is an orthogonal matching pursuit (OMP) algorithm.

17. The system of claim 11, wherein the sound data are created based on electronical signals generated by a microphone array located in the room.

18. The system of claim 11, wherein the sound waves are produced by at least one speaker located in the room.

19. The system of claim 11, comprising determining a match for a plurality of reflections with a plurality of steering vectors, respectively to estimate the direction-of-arrival (DOA) for the plurality of reflections.

20. The system of claim 11, wherein the reflections are early room reflections containing at least the $1^{st}$ reflection, the at least first two room reflections, the at least first 3 room reflections, at least 10 room reflections, or at least 20 room reflections.

\* \* \* \* \*